United States Patent
McVey et al.

(10) Patent No.: US 11,782,163 B2
(45) Date of Patent: Oct. 10, 2023

(54) OBJECT DETECTION AND CHARACTERIZATION USING A LIDAR-BASED SENSOR

(71) Applicant: The Aerospace Corporation, El Segundo, CA (US)

(72) Inventors: John McVey, El Segundo, CA (US); Henry Helvajian, El Segundo, CA (US); Shawn Perdue, El Segundo, CA (US); Glenn Peterson, El Segundo, CA (US); Marlon Sorge, El Segundo, CA (US); David Cardoza, El Segundo, CA (US); Joseph Gangestad, El Segundo, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 1071 days.

(21) Appl. No.: 16/522,789

(22) Filed: Jul. 26, 2019

(65) Prior Publication Data

US 2021/0025977 A1  Jan. 28, 2021

(51) Int. Cl.
  *G01S 7/481* (2006.01)
  *G01S 17/89* (2020.01)
  (Continued)

(52) U.S. Cl.
  CPC ............ *G01S 17/931* (2020.01); *G01S 17/89* (2013.01); *G01S 17/933* (2013.01); *G01S 7/481* (2013.01)

(58) Field of Classification Search
  CPC ...... G01S 17/931; G01S 17/89; G01S 17/933; G01S 7/481; G01S 7/4802; G01S 17/003; G01S 17/58; G01S 17/95; G01S 17/10; G01S 7/4863; G01S 17/936; Y02A 90/10; B64G 1/10; B64G 1/443; B64G 1/68
  (Continued)

(56) References Cited

U.S. PATENT DOCUMENTS

| | | | | |
|---|---|---|---|---|
| 5,206,698 A | * | 4/1993 | Werner | G01S 17/95 356/342 |
| 5,231,480 A | * | 7/1993 | Ulich | G01S 17/89 348/31 |

(Continued)

FOREIGN PATENT DOCUMENTS

| | | |
|---|---|---|
| CN | 105913452 A | 8/2016 |
| EP | 1167997 B1 | 8/2003 |

OTHER PUBLICATIONS

"Displacement (geometry)," Wikipedia, downloaded Aug. 30, 2022 from https://en.wikipedia.org/w/index.php?title=Displacement_(geometry)&oldid=849386620, 3 pp. (Year: 2018).*

(Continued)

*Primary Examiner* — Daniel L Murphy
(74) *Attorney, Agent, or Firm* — LeonardPatel PC

(57) ABSTRACT

Systems, apparatuses, and methods for identifying and tracking objects (e.g., debris, particles, space vehicles, etc.) using one or more light detection and ranging (LIDAR)-based sensors are disclosed. Such systems, apparatuses, and methods may be particularly beneficial for detecting millimeter scale and/or sub-millimeter scale objects. Such systems, apparatuses, and methods may be used for detection of objects in space, in the atmosphere, or in the ocean, for example.

43 Claims, 18 Drawing Sheets

(51) Int. Cl.
*G01S 17/93* (2020.01)
*G01S 7/486* (2020.01)
*G01S 17/931* (2020.01)
*G01S 17/933* (2020.01)

(58) Field of Classification Search
USPC .......................................................... 356/5.01
See application file for complete search history.

(56) References Cited

U.S. PATENT DOCUMENTS

| | | | | |
|---|---|---|---|---|
| 5,815,250 | A * | 9/1998 | Thomson | G01S 17/10 356/28 |
| 6,782,207 | B1 * | 8/2004 | Efimov | H04B 10/1125 398/118 |
| 7,961,301 | B2 * | 6/2011 | Earhart | G01S 7/4816 356/5.01 |
| 8,628,044 | B2 | 1/2014 | Poulos | |
| 8,833,702 | B2 | 9/2014 | Briskman | |
| 8,923,561 | B2 | 12/2014 | Hanada et al. | |
| 8,976,245 | B2 | 3/2015 | Englert | |
| 9,187,189 | B2 | 11/2015 | Griffith et al. | |
| 9,726,761 | B2 * | 8/2017 | Halmos | G01S 17/58 |
| 10,234,546 | B2 * | 3/2019 | Droz | G01S 17/10 |
| 2012/0286098 | A1 | 11/2012 | Poulos | |
| 2013/0147952 | A1 | 6/2013 | Englert | |
| 2013/0170707 | A1 | 7/2013 | Hanada et al. | |
| 2013/0292517 | A1 | 11/2013 | Briskman | |
| 2014/0107865 | A1 | 4/2014 | Griffith et al. | |
| 2014/0168634 | A1 | 6/2014 | Kameyama et al. | |
| 2017/0067996 | A1 | 3/2017 | Coyle et al. | |
| 2017/0096242 | A1 | 4/2017 | Alfano et al. | |
| 2019/0025430 | A1 * | 1/2019 | Rohani | G01S 17/89 |
| 2019/0302141 | A1 * | 10/2019 | Caldwell | G01S 7/4802 |

OTHER PUBLICATIONS

"Doppler effect," Wikipedia, downloaded Aug. 30, 2022 from https://en.wikipedia.org/wiki/Doppler_effect, 10 pp. (Year: 2022).*
"Elliptic Integral of the Second Kind," Wolfram MathWorld, downloaded Aug. 30, 2022 from https://mathworld.wolfram.com/EllipticIntegraloftheSecondKind.html, 3 pp. (Year: 2022).*
"Fresnel equations," Wikipedia, downloaded Aug. 30, 2022 from https://en.wikipedia.org/wiki/Fresnel_equations, 13 pp. (Year: 2022).*
"Gaussian beam," Wikipedia, downloaded Aug. 30, 2022 from https://en.wikipedia.org/wiki/Gaussian_beam, 17 pp. (Year: 2022).*
"Car carrier trailer," Wikipedia, downloaded Sep. 2, 2022 from https://en.wikipedia.org/w/index.php?title=Car_carrier_trailer&oldid=708986728, 3 pp. (Year: 2016).*
Kroon, "The classical oscillator model and dielectric constants extracted from infrared reflectivity measurements," Infrared Physics & Technology 51 (2007), pp. 31-43. (Year: 2007).*
Deyle, "Valve's Lighthouse_Tracking System May Be Big News for Robotics," Hizook, 2015, downloaded Feb. 6, 2020 from http://www.hizook.com/blog/2015/05/17/valves-lighthouse-tracking-system-may-be-big-news-robotics[Feb. 6, 2020, 10 pp. (Year: 2015).*
"LIDAR", Wikipedia, https://en.wikipedia.org/wiki/Lidar.
Anderson, Paul, et al., "Space Debris Detection and Characterization Using CubeSat Constellations", The Aerospace Corporation, Jun. 1, 2016.
Brumbaugh, K. M., Kjellberg, H. C., Glenn Lightsey, E., Wolf, A., & Laufer, R. (2012). In-situ sub-millimeter space debris detection using CubeSats. In Guidance and Control 2012—Advances in the Astronautical Sciences: Proceedings of the 35th Annual AAS Rocky Mountain Section Guidance and Control Conference (vol. 144, pp. 789-803).
Flegel, Sven K., et al., "Multi-Layer Insulation Model for Master-2009", Institute of Aerospace Systems, Technische Universitat Braunschweig, Germany, Jun. 17, 2011.
Gruntman, Mike, "Passive Optical Detection of Submillimeter and Millimeter Size Space Debris in Low Earth Orbit", Acta Astronautica, vol. 105, Issue 1, Dec. 2014, pp. 156-170.
Hamilton, J., et al., "Development of the Space Debris Sensor", Proc. 7th European Conference on Space Debris, Darmstadt, Germany, Apr. 18-21, 2017, published by the ESA Space Debris OfficeEd. T. Flohrer & F. Schmitz, (http://spacedebris2017.sdo.esoc.esa.int, Jun. 2017).
Ivanov, Stoil et al., "Space Debris Identification, Classification and Aggregation with Optimized Satellite Swarms", http://castra.org/wp-content/uploads/2018/02/MIC4_full_paper_Space-Debris_Sofia-University_fin_revised_v3_greyscale.pdf.
Krisko, P.H., "The New NASA Orbital Debris Engineering Model ORDEM 3.0", https://ntrs.nasa.gov/archive/nasa/casi.ntrs.nasa.gov/20140009932.pdf.
McCall, Paul D., "Modeling, Simulation, and Characterization of Space Debris in Low-Earth Orbit", Florida International University, Nov. 15, 2013.
NASA ISS Space Debris Sensor Page, https://www.nasa.gov/mission_pages/station/research/experiments/2145.html#overview, retrieved from the internet Aug. 23, 2018.

* cited by examiner

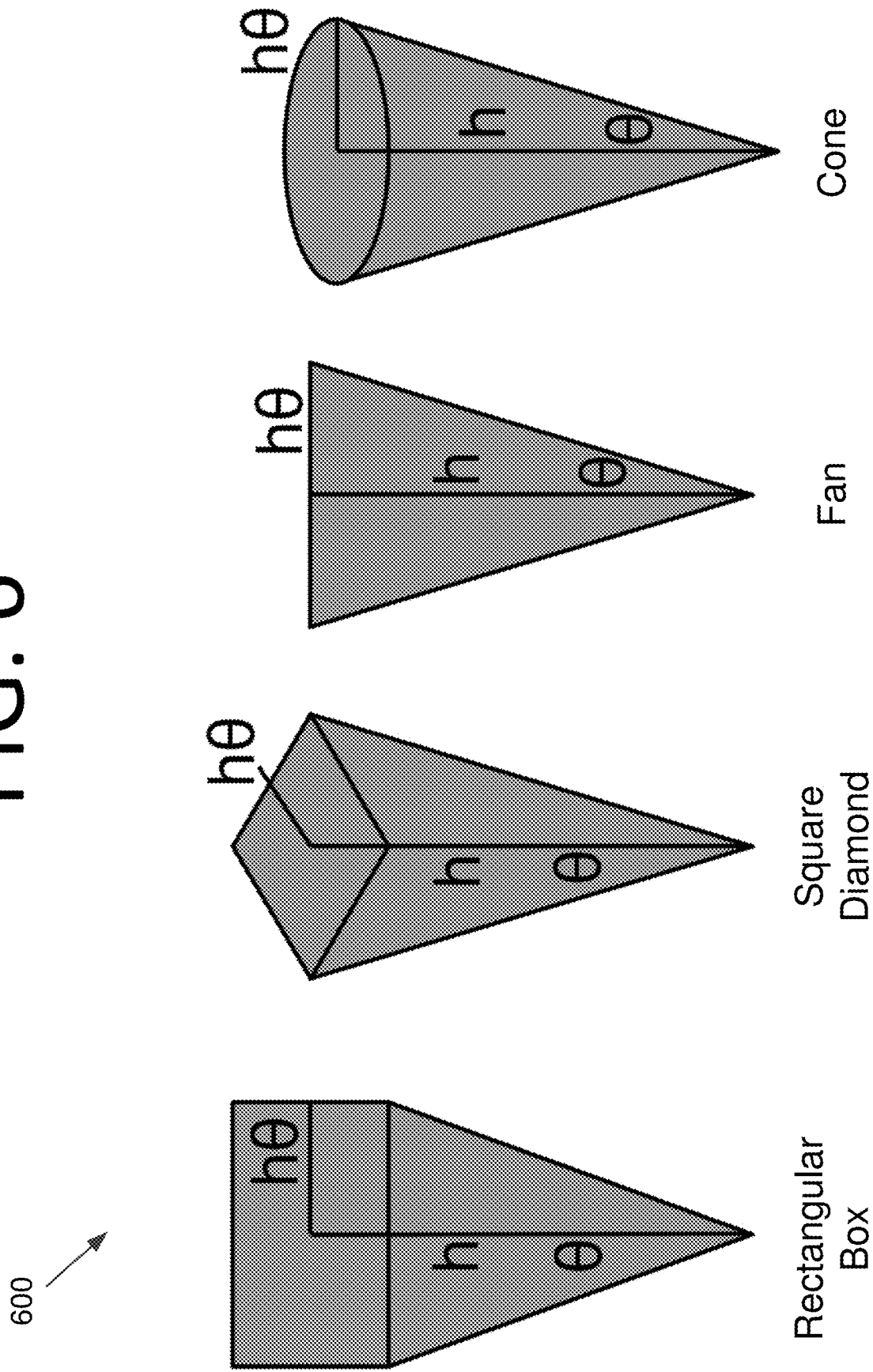

870

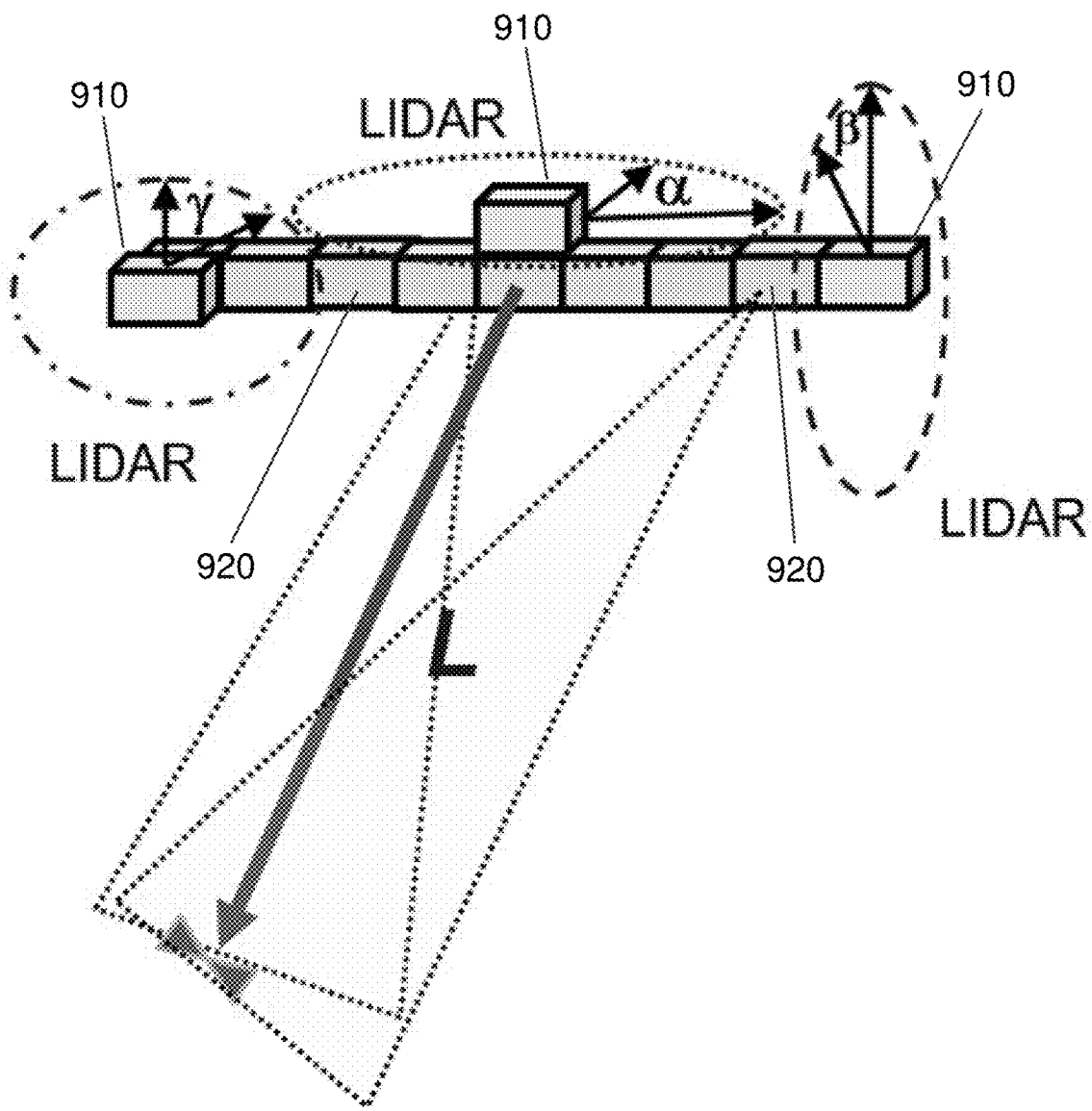

1000

OBJECT DETECTION AND CHARACTERIZATION USING A LIDAR-BASED SENSOR

STATEMENT OF GOVERNMENT INTEREST

This invention was made with government support under contract no. FA8802-19-C-0001 awarded by the U.S. Department of the Air Force. The government has certain rights in the invention.

FIELD

The present invention generally relates to object detection, and more particularly, to systems, apparatuses, and methods for identifying and tracking objects using one or more light detection and ranging (LIDAR)-based sensors.

BACKGROUND

Space debris, including the space debris population that is too small to be tracked by ground-based radar, poses a threat to all spacecraft traversing low Earth orbit (LEO), and especially to spacecraft that perform missions in LEO. Debris from 10 cm to 1 mm in size is shown approximately to scale in image 100 of FIG. 1 for visual comparison. Graph 200 of FIG. 2 shows LEO debris spatial density and distribution. It should be noted that objects at 600 km and below will be cleared much faster due to reentry than higher orbit objects due to atmospheric drag from the exosphere.

~16,000 "large" debris objects of over 10 cm in size are cataloged and tracked by the Consolidated Space Operations Center (CSpOC). However, debris of smaller sizes is considered untrackable and is currently modeled statistically using in situ measurements from impact detectors. The population of debris that is too small to track is significantly larger than the population of debris that is tracked and cataloged by ground-based systems. Collision with this sub-trackable debris can lead to loss of spacecraft or damage to and degradation of, or complete failure of, subsystem components (e.g., sensors, solar arrays, antennae, etc.).

There are two commonly available sub-trackable debris environment models: ORDEM 3.0 (NASA) and MASTER 2009 (ESA). An additional model called ADEPT exists, but this model is not publicly available. However, these models have significant discrepancies between them, especially in the millimeter to sub-millimeter debris population. Graph 300 of FIG. 3 shows the quantitative disparity between the two models.

Resolving these model discrepancies can be achieved experimentally by physically detecting the fluence (number of objects (#)/m$^2$/year) of the millimeter to sub-millimeter debris environment using a physical impact sensor or other detection system. Impact detectors or sensors that are mounted externally to a spacecraft and measure the impact of small debris on a detection surface area of the device have been at most one square meter (m$^2$) in size. NASA, the German Aerospace Center (DLR), the European Space Agency (ESA) and the Japanese Aerospace Exploration Agency (JAXA) have developed and flown several impact detector prototypes that were designed specifically for this purpose.

Alternatively, materials exposed to the space environment for a period of years are returned to Earth for impact studies. These materials could be anything on the surface of a space vehicle that was impacted—e.g., solar arrays, subsystem components, exterior panels, etc. One famous example of this approach was the window from the Challenger space shuttle on STS-7 that demonstrated the damage a small debris object could do to a spacecraft. In that case, the debris damaged the first window pane, showing the damage that small objects can cause at orbital speeds.

Another approach that has been applied for debris detection purposes is optical debris detection using space-based cameras. This concept relies on sunlight reflecting off small debris pieces, which is then detected using a telescope/camera system. There have been a few concept studies developed, but none are known to have flown on a dedicated mission.

A problem with the experiments that have flown to date is that the detection areas are not large enough to provide a statistically significant sample in the debris size ranges of interest (e.g., 0.1 mm to 1 mm). Also, most of these experiments were conducted from the International Space Station (ISS) or space shuttle at relatively low LEO altitudes. With multiple collision events occurring at altitudes of ~800 km, for example, debris detection experiments should also be conducted in these orbital regimes.

However, placing sensors at these altitudes is not only costly, but the results would not provide a statistically relevant sample size without a sufficiently large detection area. Furthermore, for returned surfaces, the material structure size that can be returned for study is small, and there is no record of when the impact occurred. Also, the only estimate of the impactor size is based on inference from the crater size.

As for optical debris detecting telescopes, these are limited by the size ranges they can see based on range, detector sensitivity, lighting conditions, and object brightness. Typically, these systems focus on detection of debris of a size of 1 cm or greater. Also, passively deriving characteristics of small debris at distances on the order of kilometers would be difficult.

In the context of atmospheric or underwater small object detection, systems that locate and characterize small objects at significant distances and over large areas may also be useful. Accordingly, improved systems and approaches may be beneficial.

SUMMARY

Certain embodiments of the present invention may provide solutions to the problems and needs in the art that have not yet been fully identified, appreciated, or solved by conventional debris detection technologies. For example, some embodiments pertain to systems, apparatuses, and methods for identifying and tracking objects (e.g., debris, particles, space vehicles, etc.) using one or more light detection and ranging (LIDAR)-based sensors. In some embodiments, the objects may be millimeter scale and/or sub-millimeter scale.

In an embodiment, a LIDAR-based system includes at least one laser configured to transmit a beam comprising light pulses at a predetermined wavelength and frequency. The LIDAR-based system also includes at least one light-sensitive receiver configured to receive light from the beam of light pulses after being reflected off of an object, reemitted after absorption by the object, or both, and generate a voltage or a current from the received light. The LIDAR-based system further includes a computing system configured to receive the generated voltage or current from the at least one light-sensitive receiver and determine object location, distance, velocity, change in velocity, size, rotation, material properties, or any combination thereof, from the voltage or current received from the at least one light-sensitive receiver.

In another embodiment, a computer-implemented method includes receiving a generated voltage or current from a light-sensitive receiver, by a computing system. The computer-implemented method also includes determining an object location, distance, velocity, change in velocity, size, rotation, material properties, or any combination thereof, from the voltage or current received from the light-sensitive receiver.

In yet another embodiment, a LIDAR-based system includes a laser source vehicle including at least one laser. The at least one laser is configured to transmit a beam that includes light pulses at a predetermined wavelength and frequency. The LIDAR-based system also includes a detector vehicle including at least one light-sensitive receiver, a telescope, and a polarizer. The at least one light-sensitive receiver is configured to receive light from the beam of light pulses after being reflected off of an object, reemitted after absorption by the object, or both, and generate a voltage or a current from the received light. The LIDAR-based system further includes a computing system configured to receive the generated voltage or current from the at least one light-sensitive receiver and determine object location, distance, velocity, change in velocity, size, rotation, material properties, or any combination thereof, from the voltage or current received from the at least one light-sensitive receiver. The detector vehicle has a relative velocity with respect to the laser source vehicle that is faster than the laser source vehicle. The laser source vehicle communicates a direction of the at least one laser and when a respective beam of light from the at least one laser will be transmitted. The computing system, based on the voltage or current produced by the received light after passing through the telescope and polarizer and interacting with the light-sensitive receiver, is configured to determine an angle from an observation direction vector and a laser direction vector.

In still another embodiment, a LIDAR-based system includes a plurality of LIDAR vehicles and at least one framework vehicle connecting the plurality of LIDAR vehicles. Each of the plurality of LIDAR vehicles includes a laser configured to transmit a beam comprising light pulses at a predetermined wavelength and frequency. Each of the plurality of LIDAR vehicles also includes a light-sensitive receiver configured to receive light from the beam of light pulses after being reflected off of an object, reemitted after absorption by the object, or both, and generate a voltage or a current from the received light. The LIDAR-based system further includes a computing system configured to receive the generated voltage or current from the light-sensitive receivers of the plurality of LIDAR vehicles and determine object location, distance, velocity, change in velocity, size, rotation, material properties, or any combination thereof, from the voltage or current received from the light-sensitive receivers.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6 illustrates some potential LIDAR beam shapes, according to an embodiment of the present invention.

FIG. 9 illustrates a system of interconnected small satellites that are configured to perform LIDAR-based debris detection, according to an embodiment of the present invention.

DETAILED DESCRIPTION OF THE EMBODIMENTS

Some embodiments of the present invention pertain to systems, apparatuses, and methods for identifying and tracking objects (e.g., debris, particles, space vehicles, etc.) using one or more light detection and ranging (LIDAR)-based sensors. Some embodiments may be particularly beneficial for detecting millimeter scale and/or sub-millimeter scale objects. Embodiments may be used for detection of objects in space, in the atmosphere, or in the ocean, for example.

Detection in Space

Figure 1:
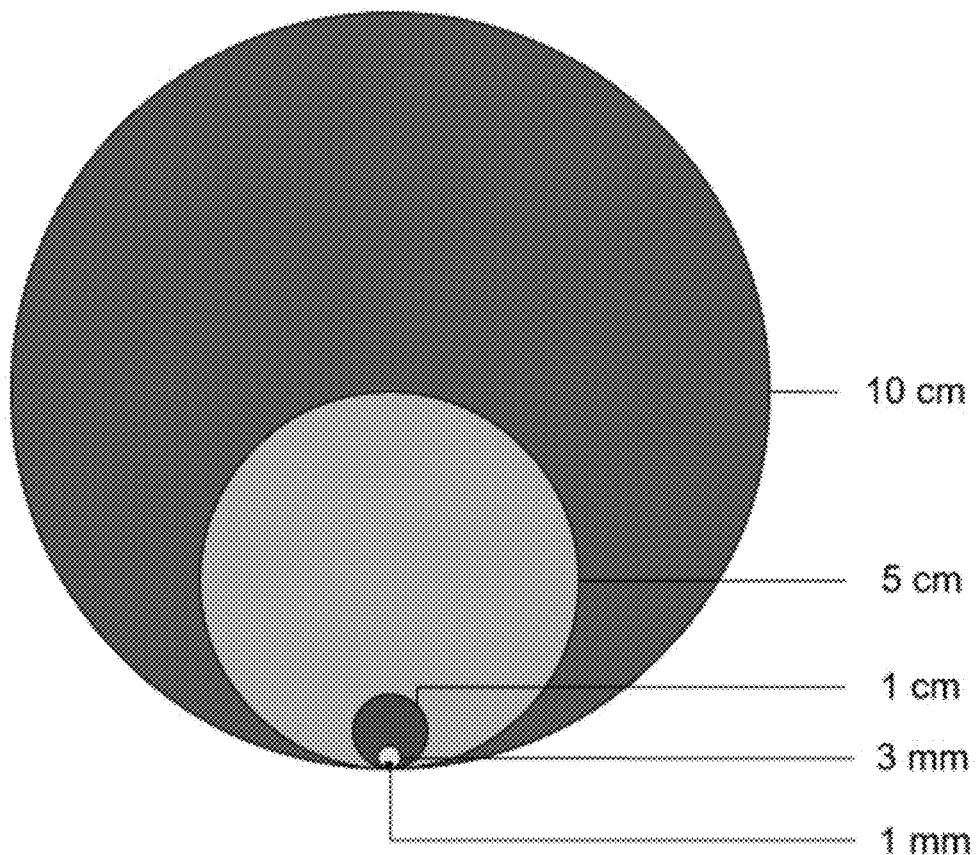
FIG. 1 illustrates sizes of round debris from 10 cm down to 1 mm for comparison.
Figure 2:
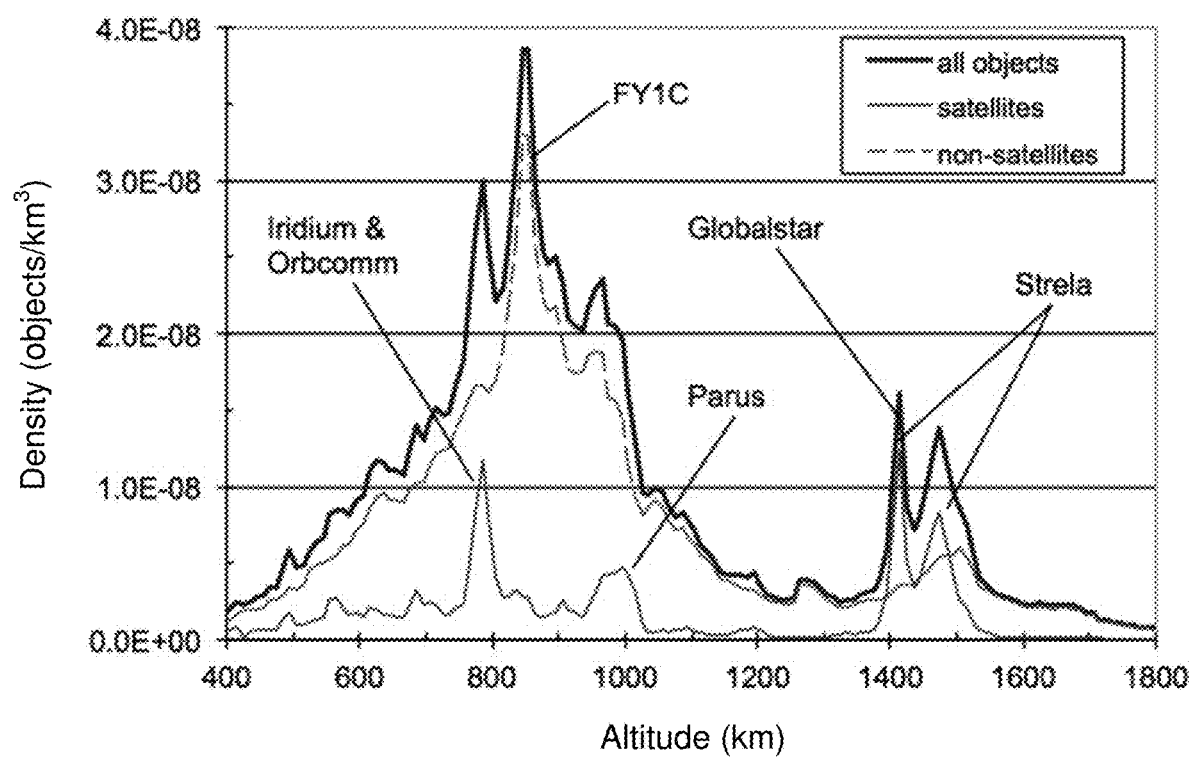
FIG. 2 is a graph illustrating LEO debris density and distribution as a function of altitude.
Figure 3:
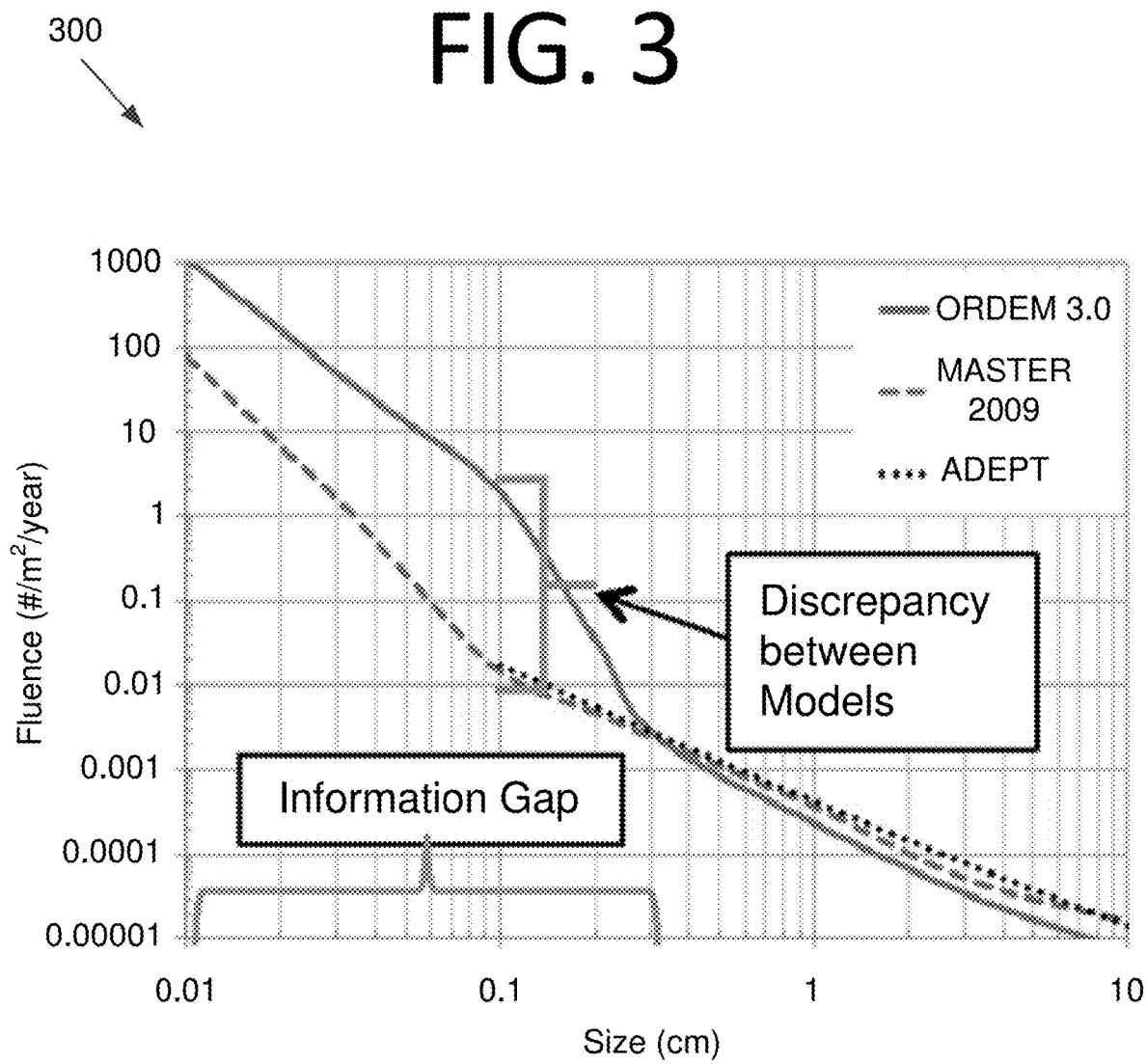
FIG. 3 is a graph illustrating fluence predictions of the ORDEM 3.0, MASTER 2009, and ADEPT models.
Figure 4:
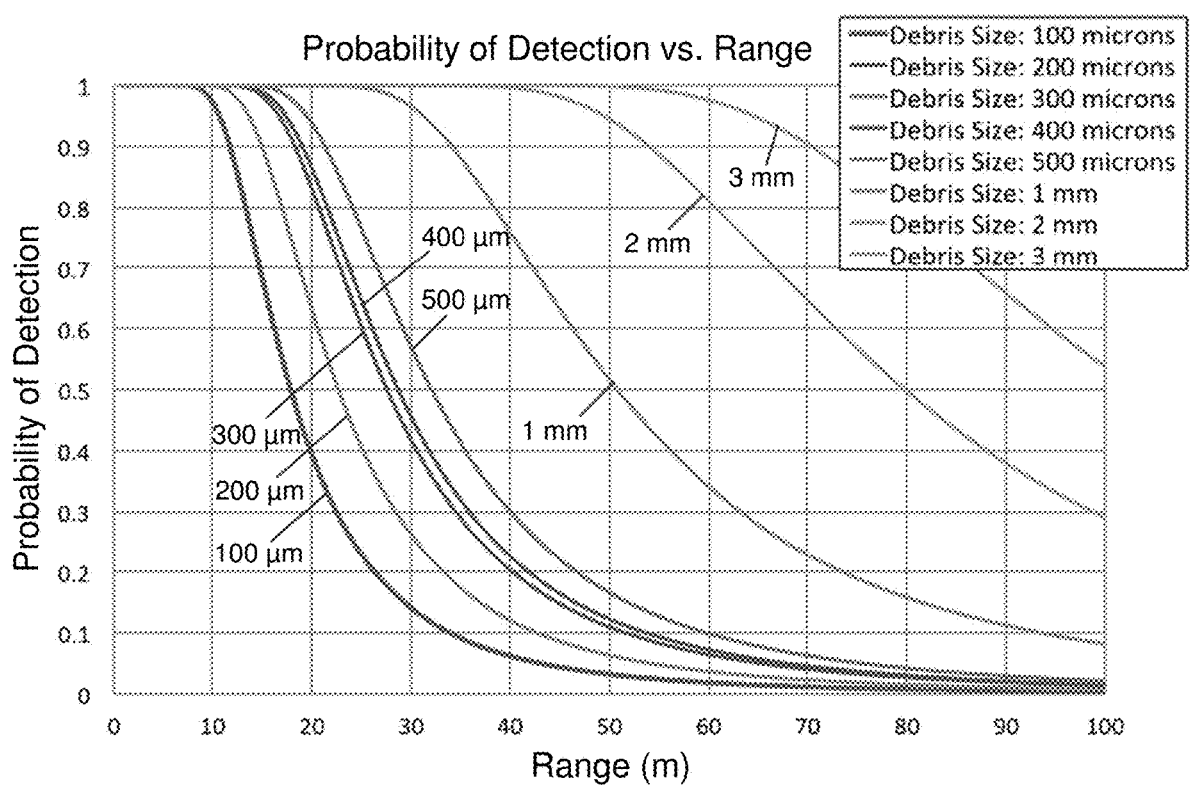
FIG. 4 is a graph illustrating results of a debris detection probability calculation at distances in the tens of meters using a signal-to-noise ratio (SNR) of three, according to an embodiment of the present invention.

Recent calculations using LIDAR-based sensors show that debris characterization on the scale of 0.5 mm to 1 mm is possible within a volume of one to ten km$^3$ if the LIDAR is hosted on a space vehicle, such as a satellite. Moreover, analysis shows that a relatively small laser (e.g., less than 10 watts) used along with the sensor can be hosted on a CubeSat class satellite in the orbit of interest. Graph 400 of FIG. 4 shows the probability of detection versus detection range (m) using a signal-to-noise ratio (SNR) of three, which is a practical, but relatively low value. It should be noted that graph 400 pertains to a fan beam LIDAR used for short range debris detection (e.g., on the order of hundreds of meters). For longer range detection (e.g., on the order of tens of kilometers or more), a narrower beam, such as a conical beam, may be used.

Figure 5:
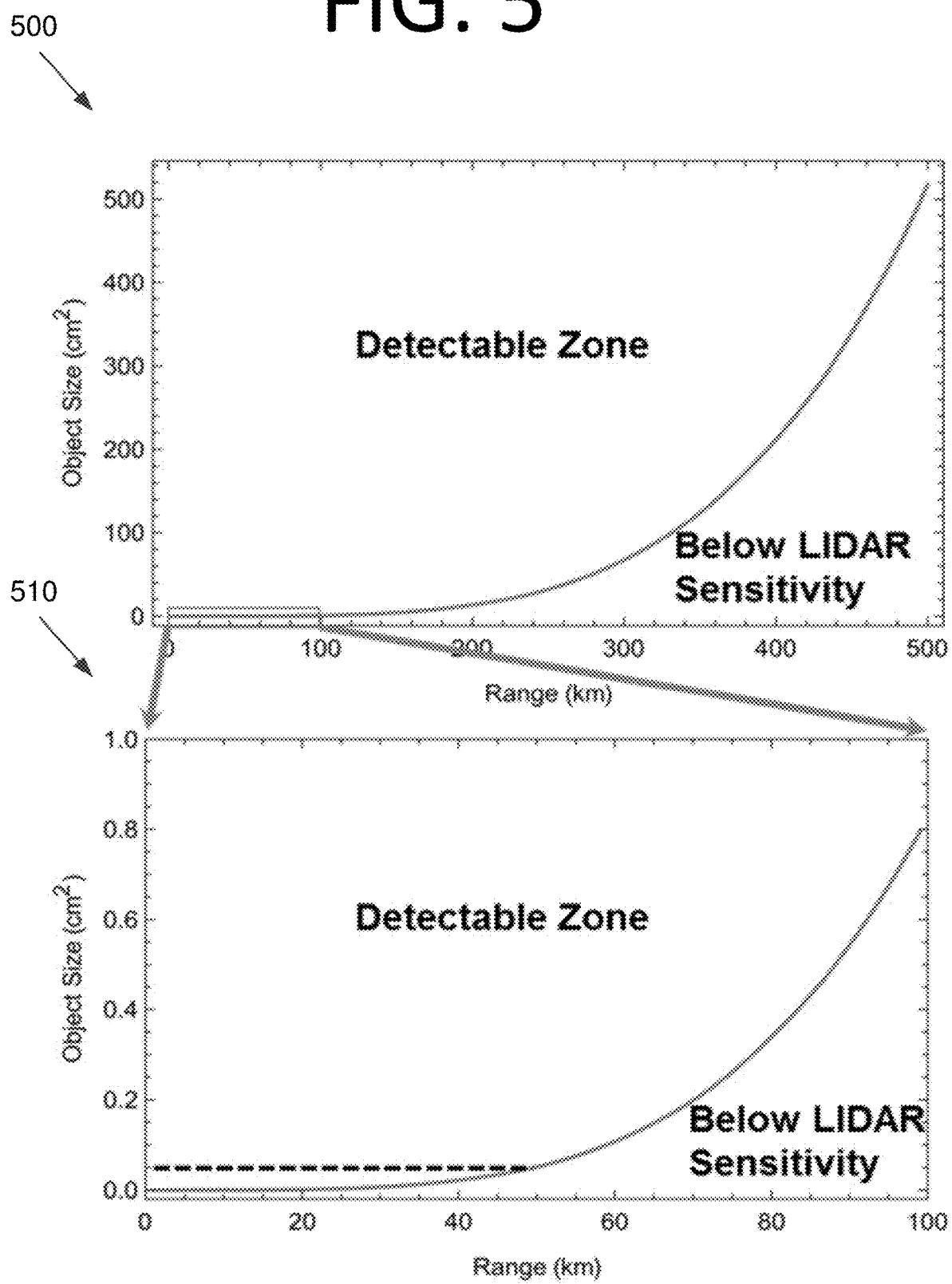
FIG. 5 illustrates graphs of debris detection in terms of cross-section of area versus range for a 5 W average power laser, operating with a 100 kHz pulse repetition rate and with 5 μrad pointing jitter, according to an embodiment of the present invention.

Graphs 500, 510 of FIG. 5 illustrate debris detection versus range for a 5 W average power laser, operating with a 100 kHz repetition rate and with 5 µrad pointing jitter, according to an embodiment of the present invention. A variant of this laser is already in orbit on several CubeSats for optical communication testing. The curves delineate the LIDAR detectable and non-detectable zones. The plots show the object size that can be detected as a function of range in kilometers. Just focusing on lower graph 510, which is an expanded version of upper graph 500, the calculation suggests that an object with area of 0.05 cm$^2$ (dashed horizontal line) can be detected at a range of 50 km, assuming the debris to be Lambertian spheres with an albedo of 0.17 (per NASA Orbital Debris Program Office (ODPO) standards). A variant of such a laser is already in orbit on several Aerospace CubeSats for testing.

LIDAR operates by transmitting light pulses (usually from a polarized laser, and often in an infrared (IR) wavelength of approximately 1 µm) of short pulse duration (e.g., in the order of femtoseconds or picoseconds) and with some optical divergence. While optical divergence may be relatively low in some embodiments, flash-mode LIDAR imagers, for example, often have a beam divergence of greater than 30°. The divergence of the nascent laser can be reduced by the addition of a telescope. To the first order, the laser divergence from the telescope follows the equation $D_I*(D_{Input}/D_{Output})$, where $D_I$ is the nascent laser divergence and $D_{Input}$ and $D_{Output}$ are the telescope input and output beam diameters, respectively. The larger the output laser beam diameter, the lower the divergence.

The beam shape at range may have the shape of a fan or other shapes, such as shapes 600 of FIG. 6. The intensity distribution within this shape may have a Gaussian or flat-top shape in some embodiments. However, it should be noted that any other suitable beam shape may be used without deviating from the scope of the invention.

Beams may be formed by various lens arrangements and result in different volumetric distribution of the laser energy. This directly affects the calculations. For example, a fan beam would be effective over a longer range than a conical or square beam, although the detection volume would be smaller at each range.

A piece of debris entering the volume of space defined by the laser beam will scatter the laser light, and a fraction of the back-scattered photons reach, and are sensed by, a photon-sensitive detector. Examples of suitable photodetectors in some embodiments include, but are not limited to, Geiger-mode avalanche photodiode (APD) detectors, regular APD detectors, fast photodiodes, a charge-coupled device (CCD), an array of one or more detector types, or any combination thereof. Range can automatically be calculated by measuring the round-trip time of the laser pulse. If two laser pulses with known time separation (e.g., ~50-100 µs) are sent out in a pulse sequence, a velocity vector of the identified debris can also be generated from the return-scattered photons. See, for example, FIG. 11 and the associated description thereof.

An advantage of LIDAR over flying fixed area impact detectors, for example, is that the debris information delivered by the LIDAR is not from just one point. Rather, the debris detection information can be from the whole range of the LIDAR sensitivity. According to the calculations in FIG. 5, such a device can detect debris of only a few mm at a range of over 50 km. At closer range, and by optical polarization techniques, smaller particles can be detected. To utilize the polarization effects, the light source and receiver should be at an angle (e.g., two free-flying space vehicles with one acting as a probe and the other acting as a detector). For any debris size, the equations that describe the reflected light amplitude as a function of angle (between the probe or light source and the detector, the size of the debris particle, the refractive index of the debris particle, and polarization of the light are described in Mie scattering theory. For analog sensors, object size may be determined by measuring the number (i.e., count) of photons scattered from the same location during a predetermined period of time and relating the count to the physical cross section of the object. For a given angle, these equations can be applied for detection by periodically varying the incident light polarization and detected light polarization.

However, as the particle size gets smaller, but still much larger than the wavelength of the light, the scattering amplitude (i.e., the amount of reflected light) shows a strong dependence with the polarization of the incident light for the case of small particles (e.g., 3 to 100 microns). Under these conditions, Mie scattering theory describes the amplitude of the scattered light as a function of angle and for a given polarization. Polarization control is less relevant to discern material properties, such as whether the object is metal or some other material. However, some information can be inferred by utilizing multiple laser wavelength sources (e.g., (visible/infrared/ultraviolet laser pulses) and comparing the scattering amplitude. In fact, given a wide enough wavelength radiation source, it has been suggested that grain size and other physical and compositional properties may also be deduced. See C. Pilorget et al., "Wavelength Dependence of Scattering Properties in the VIS-NIR and Links with Grain-Scale Physical and Compositional Properties," Icarus 267, pp. 296-314 (2016).

With respect to material properties, some information can be determined by utilizing multiple laser wave sources and measuring the reflectivity (i.e., the return of the signal from the various laser wavelengths from the same debris object). Metals have a broad band reflectivity that diminishes in the IR wavelengths. Dielectrics have more specific wavelength reflectivity, but in general, the reflectivity R of a material (R=intensity of reflected light/intensity of incident light) is governed by the following equation:

$$R = \frac{(\varepsilon^{1/2} - 1)^2}{(\varepsilon^{1/2} + 1)^2} \tag{1}$$

where ε is the dielectric constant of the material, which is a measurable property.

Deducing whether an object is rotating is more difficult since it places a requirement on the object shape. Ascertaining whether a very small object (e.g., a piece of debris) is rotating would be difficult if the shape is spherical (e.g., a ball bearing). However, for larger objects and with higher incident laser powers, the characterization of the spectral properties of the reflected light may provide an indication of the shape. A non-rotating spherical shape would return photons at close to the spectral properties of the incident laser. However, for a spinning shape, some returned photons would be Doppler shifted to the blue (i.e., photons scattering from an edge spinning toward the detector) and other returned photons would be Doppler shifted to the red (i.e., photons scattering from an edge spinning away from the detector). Notwithstanding all the possible details that can be gleaned, in situ detection of small debris is feasible using LIDAR even with orbital speeds between the two objects of around 14 km/s, which is not possible to accomplish using traditional radar, for example.

In order to determine the blue/red shift and the rotation rate, assume v is the angular rotation velocity of the debris object. Also assume that the object is large enough such that a laser photon of frequency $f=c/\lambda$ (where c is speed of light and λ is the photon wavelength) being reflected back to the sensor from the rotating debris edge that is moving toward the sensor and from the edge that is receding from the sensor can be explained. By the Doppler equation, the measured frequency f' of the arriving laser photon from edge that is moving toward the sensor is given by $f'=f*((c+v)/(c-v))$. On the other hand, the measured frequency f' of the arriving laser photon that has scattered from the receding edge is given by $f'=f*((c-v)/(c+v))$. If the object is not rotating, the measured frequency would be $f=c/\Delta$. Since f and c are known, v can be derived.

The short wavelength of a laser coupled with the ability to generate femtosecond bursts of intense light at high repetition rates makes LIDAR an excellent diagnostic for debris detection and characterization. Furthermore, the shorter wavelengths of optical waves require smaller telescope apertures to reduce divergence. High divergence represents a loss of energy on target. Currently, a 1 millirad (mrad) divergent source laser (standard commercial off-the-shelf (COTS) laser, 1 mm beam diameter) coupled to a telescope that can fit into a 3 U CubeSat (100 mm final aperture) will have an exit divergence of 10 microrads (μrad). At 50 km range, the beam size will have expanded to 1 meter. By rotating the beam 1 degree/s about the orbital track direction and on a semi-continuous basis, it is possible that the debris field about that satellite would be known with much higher fidelity than is possible today given data acquisition of over approximately one year, or even less. Because the LIDAR data is typically time stamped, information on the dynamic changes of debris can also be captured over a range of distances and orbits.

As an example mission, a 3 U CubeSat with a LIDAR as described above may be launched into a circular orbit at an 800 km altitude. Data may be acquired for a +/− 50 km range about the orbital track of the CubeSat and the data may be downlinked for analysis. The CubeSat can then reduce its orbit by 100 km, for example, and begin another scan. It is possible that in a few years, enough data can be acquired to place the debris environment model on a sounder footing. In other words, some embodiments may be used as a debris field survey technology that could even be used to catalog and predict orbits of individual small pieces of debris, in addition to providing fluence calculations. LIDAR-based sensors of some embodiments use a laser in near-optical wavelengths of approximately 800 nm (e.g., produced by an example pulsed laser diode) and 1,065 nm (e.g., produced by an example fiber laser). The wavelengths here are by way of example only based on some existing detector technology. However, any suitable wavelengths may be used without deviating from the scope of the invention.

Figure 7A:
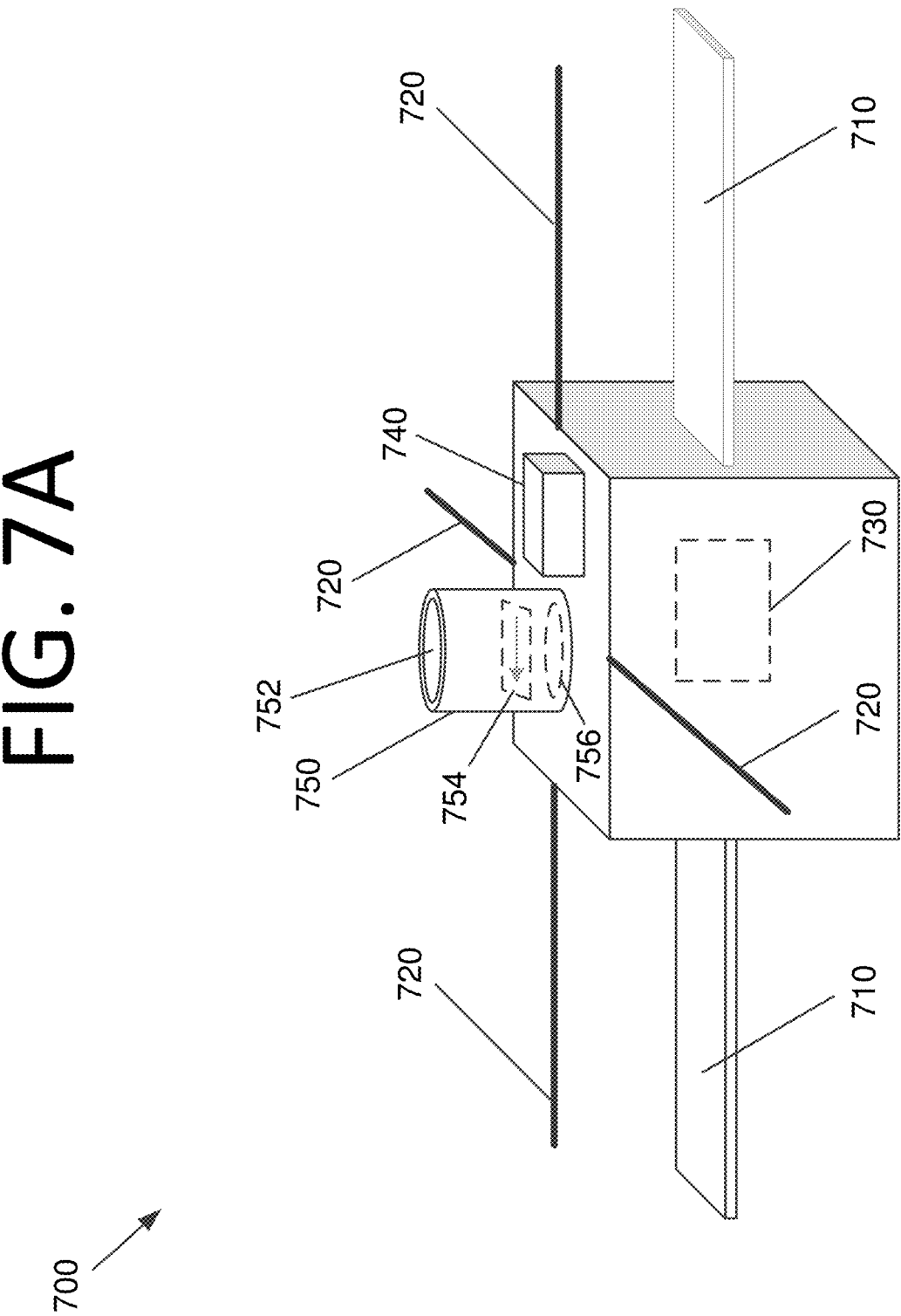
FIG. 7A is a perspective view illustrating a CubeSat equipped with a LIDAR-based sensor system, according to an embodiment of the present invention.

FIG. 7 is a perspective view illustrating a satellite 700 (e.g., a CubeSat) equipped with a LIDAR-based sensor system, according to an embodiment of the present invention. Satellite 700 includes solar arrays 710, antennae 720, and a computing system 730. In some embodiments, computing system 730 may be computing system 1400 of FIG. 14.

Figure 7B:
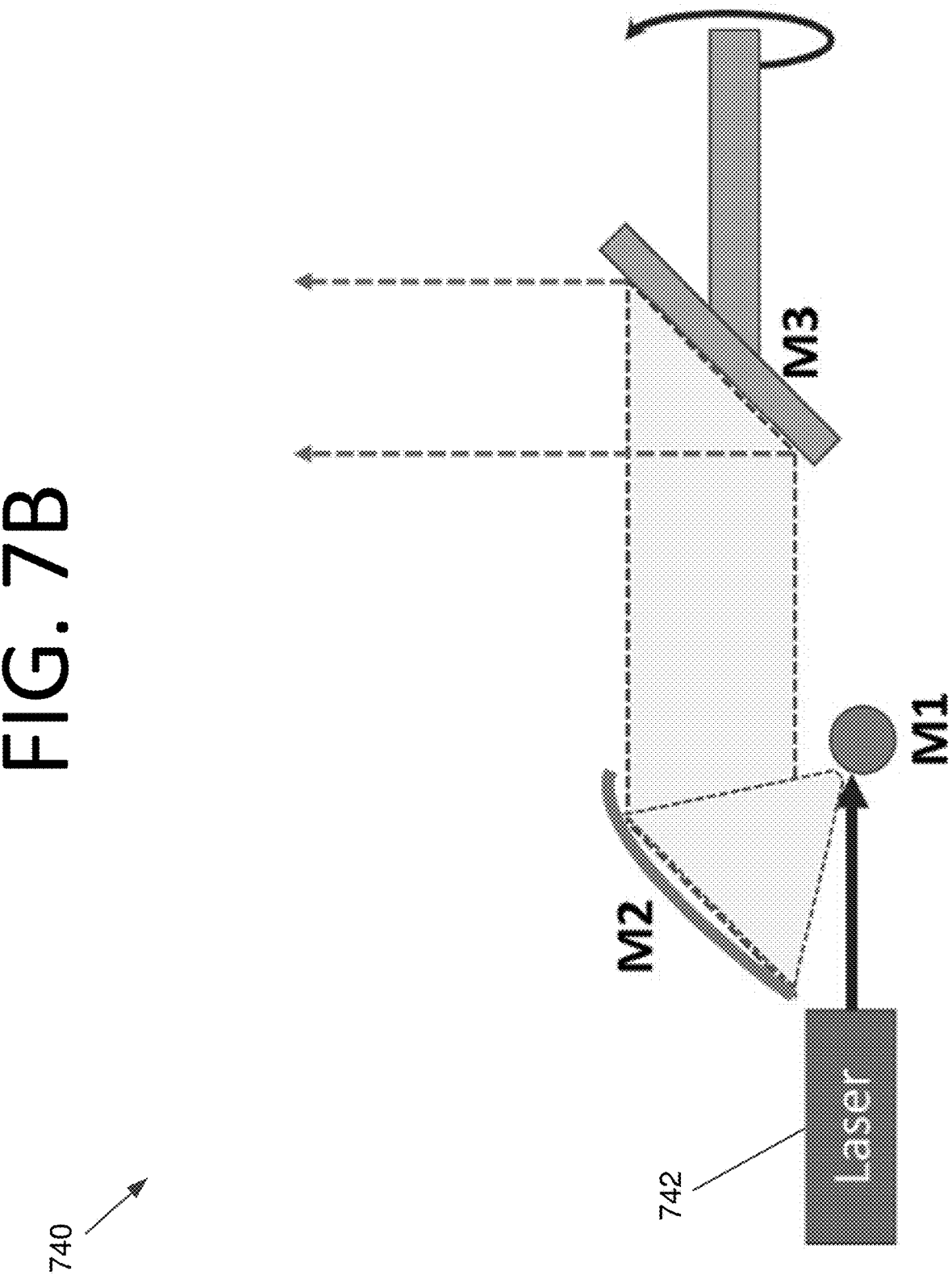
FIG. 7B illustrates a general laser system architecture, according to an embodiment of the present invention.

However, unlike conventional satellites, satellite 700 includes a laser system 740, an example embodiment of which is shown in more detail in FIG. 7B. It should be noted that laser system 740 may be external to the body of space vehicle 700, partially recessed into the body of space vehicle 740, or fully housed within the body of space vehicle 700 without deviating from the scope of the invention. Some embodiments of laser system 740 include a telescope (e.g., mirrors M1, M2, and M3 of FIG. 7B). By including a telescope, divergence of the laser beam can be decreased, and a conical laser beam, for example, can be emitted and used to detect objects at greater distances. However, in some embodiments, a telescope is not included. In certain embodiments, such as that shown in FIG. 7B, at least one mirror may rotate to provide some control of the beam direction. This may be additional to, or in lieu of, rotation of the space vehicle to change the direction in which the laser is emitted.

Referring to FIG. 7B, in laser system 740, a laser 742 projects a laser beam onto a first mirror M1, which spreads the laser beam onto a cone onto a second mirror M2. Second mirror M2 focuses the laser beam to a desired width and reflects it onward to a third mirror M3. Mirror M3 is rotatable to provide some control of the direction of the laser beam as it leaves laser system 740.

Laser system 740 emits laser light at a desired frequency and wavelength (e.g., a 100 kHz laser at 800 nm, 1,064 nm, etc.). Some of the light emitted by laser system 740 may strike an object, some photons of which are then reflected back or absorbed and emitted back towards satellite 700, where they enter a receiver 750, which may be a telescopic receiver in some embodiments. Light enters receiver 750 via a lens 752. Receiver 750 includes a polarizer 754 that enables detection using Mie scattering. The gray arrow indicates the allowed direction of the optical electric field of polarizer 754 that can pass to hit a detector 754. The allowed direction of the optical electric field may be in any desired direction without deviating from the scope of the invention. Receiver 750 may be an optical telescope of any desired type in some embodiments, such as refracting, reflecting, Newtonian, Cassegrain, Nasmyth, etc. including the associated design and mirror position(s) (not shown).

Receiver 750 includes a photodetector 756 that receives polarized light passing through polarizer 754. The beam diameter emitted by laser system 740 may match the field of view (FOV) of receiver 750 in some embodiments. Lens 752 may be a 2-inch, f/2 imaging lens for a maximum FOV. In some embodiments, photodetector 756 may be a single 150 μm photodetector that is single photon sensitive. However, any suitable number and/or type(s) of photodetectors may be used without deviating from the scope of the invention.

Light contacting lens 752 is focused onto photodetector 756, where the light creates a pulsed voltage or current (e.g., via photodiodes in photodetector 756). This voltage or current is then sent to computing system 730 (which in some embodiments may be electronics of photodetector 756), where it is processed. Characteristics of the voltage or current can then be used to determine properties of the object, such as its distance, velocity, size, rotation, material(s), and/or any other suitable property without deviating from the scope of the invention. Distance d may be determined, for instance, via the following equation:

$$d = \frac{t*c}{2} \quad (2)$$

where t is the time between pulsed laser emission and detection of the reflected/emitted light and c is the speed of light. Once a distance is known, the location of the object can be determined from the known current position of the detector (e.g., via star field mapping, sun sensors, GPS, etc.) using this as a starting point for a vector of length d in the direction of the detected object.

It should be noted that any desired number of LIDAR-based sensor systems may be included without deviating from the scope of the invention. It should also be noted that in some embodiments, one, some, or all of the surfaces of a satellite or other space vehicle may include one or more lasers and/or photodetectors. Any suitable number and location of photodetectors may be included without deviating from the scope of the invention.

However, it should be noted that using more LIDAR-based sensor systems will also increase the power requirements for their operation. As such, a suitable space vehicle should have sufficiently large and powerful solar arrays, batteries, etc. to facilitate the operation of such a system. For instance, if three 10 W lasers are used, the space vehicle should be capable of supplying 60 W of power to the lasers alone if the lasers have a 50% "wall plug" efficiency. Small CubeSat platforms may have limited available power to produce laser output at 0.5 W to 10 W, for instance. However, a "CubeSat" is merely a form factor, and an arbitrarily small or large size may be desired for a given mission. In other words, a CubeSat need not be limited to 1.5U or 3U, for example.

Per the above, different beam shapes (e.g., a fixed conical beam, a fixed cylindrical lens generating a fan beam, etc.) and/or LIDAR sensor detection areas may be used. In some embodiments, a cylindrical lens, for example, generates a fan beam that is swept out by radiating a pulse.

Figure 8A:
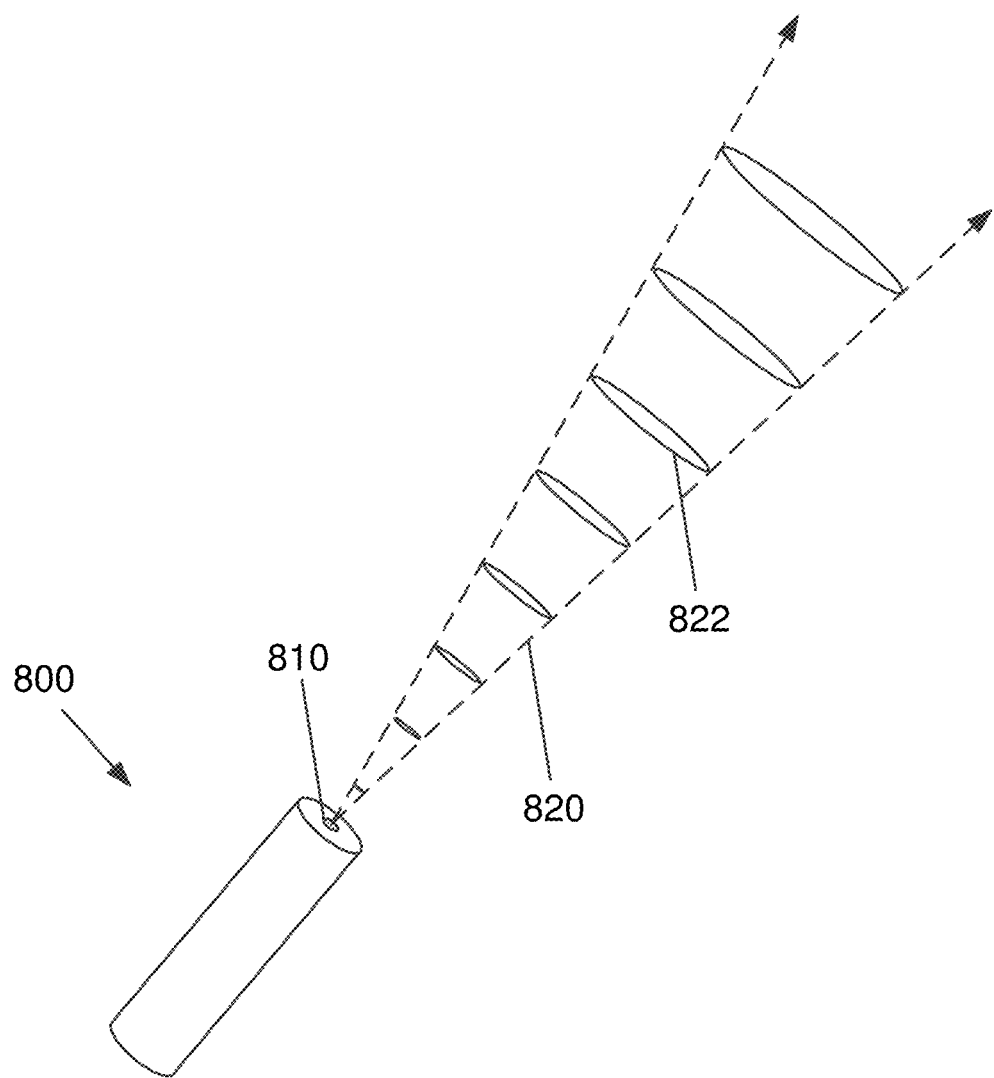
FIG. 8A illustrates a laser with a cylindrical lens that emits a fan beam for short range detection, according to an embodiment of the present invention.

FIG. 8A illustrates a laser 800 with a cylindrical lens 810 that emits a fan beam 820 for short range detection, according to an embodiment of the present invention. A fan beam is essentially a flattened cone where the beam energy is more concentrated than in a typical cone. Such a beam may be particularly effective at detecting millimeter to sub-millimeter debris. Laser 800 may be a 100 kHz laser with a 10 ns pulse duration, having powers from 0.5 W to 10 W, and a 10 µs integration time for a single pulse in some embodiments. In certain embodiments, laser 810 may include a pulsed laser diode that produces 800 nm pulses or a fiber laser that produces 1,064 nm laser pulses. Cylindrical lens 810 may have a divergence of 17.5 mrad×0.1 mrad, for example.

Systems that perform tracking of a piece of debris on the millimeter scale or larger at distances of tens of meters to kilometers may be the same in some embodiments. The pulsed laser return signal may be measured, and time stamped. The closer the debris is to the LIDAR system, the faster the sensor electronics must be. The debris distance may be calculated by the round-trip time of the laser photon pulse. For debris measurements at the sub-millimeter level, the use of optical polarization and/or a separation of the sensor and laser source may be beneficial or necessary to better diagnose polarization effects.

Because the optical scattering phenomena are of the Mie type and the reflected light as a function of optical polarization has some directionality for a given angle between the sensor and laser source, one can measure the signal level as a function of polarization at a fixed angle, or fix the laser polarization and measure the signal level as a function of the angle. The latter approach may be better done using two spacecraft, where one carries the sensor and the other carries the laser source, and the signal is monitored as a function of the relative angle between the spacecraft. The measured signal may then be placed into a Mie scattering model to derive the size of the debris. Range may be derived by the time-of-flight of the photons, as above.

Fan beam 820 includes individual laser pulses 822 that are emitted with a predetermined frequency (e.g., 10 ns pulses every 50 µs, every 100 µs, etc.). A receiver receiving the light after it is reflected and/or emitted from an object may have a single 150 µm photodetector that is single photon sensitive in some embodiments. In some embodiments, the receiver may include a silicon avalanche photodiode (APD) with 60% photon detection efficiency (PDE) and 100 dark counts per second. In certain embodiments, the receiver may include an InGaAs APD with 30% PDE and 4,500 dark counts per second. However, any suitable photodetector(s) may be used without deviating from the scope of the invention.

For a laser/receiver such as those discussed above with respect to FIGS. 7 and 8A, the surface area SA of the emitted laser pulses may be given by the following:

$$SA = 2a\sqrt{b^2 + h^2}\, E\left(\sqrt{\frac{1 - \frac{b^2}{a^2}}{1 + \frac{b^2}{h^2}}}\right) \quad (3)$$

where a is the semimajor axis of the ellipse (i.e., the large divergence axis), b is the semiminor axis (i.e., the small divergence axis), and h is the height of the cone, which is dependent on the range at which the measurement occurs. E(x) is the complete elliptic integral of the second kind. In the case of a regular cone, a and b would naturally be the same.

Figure 8B:
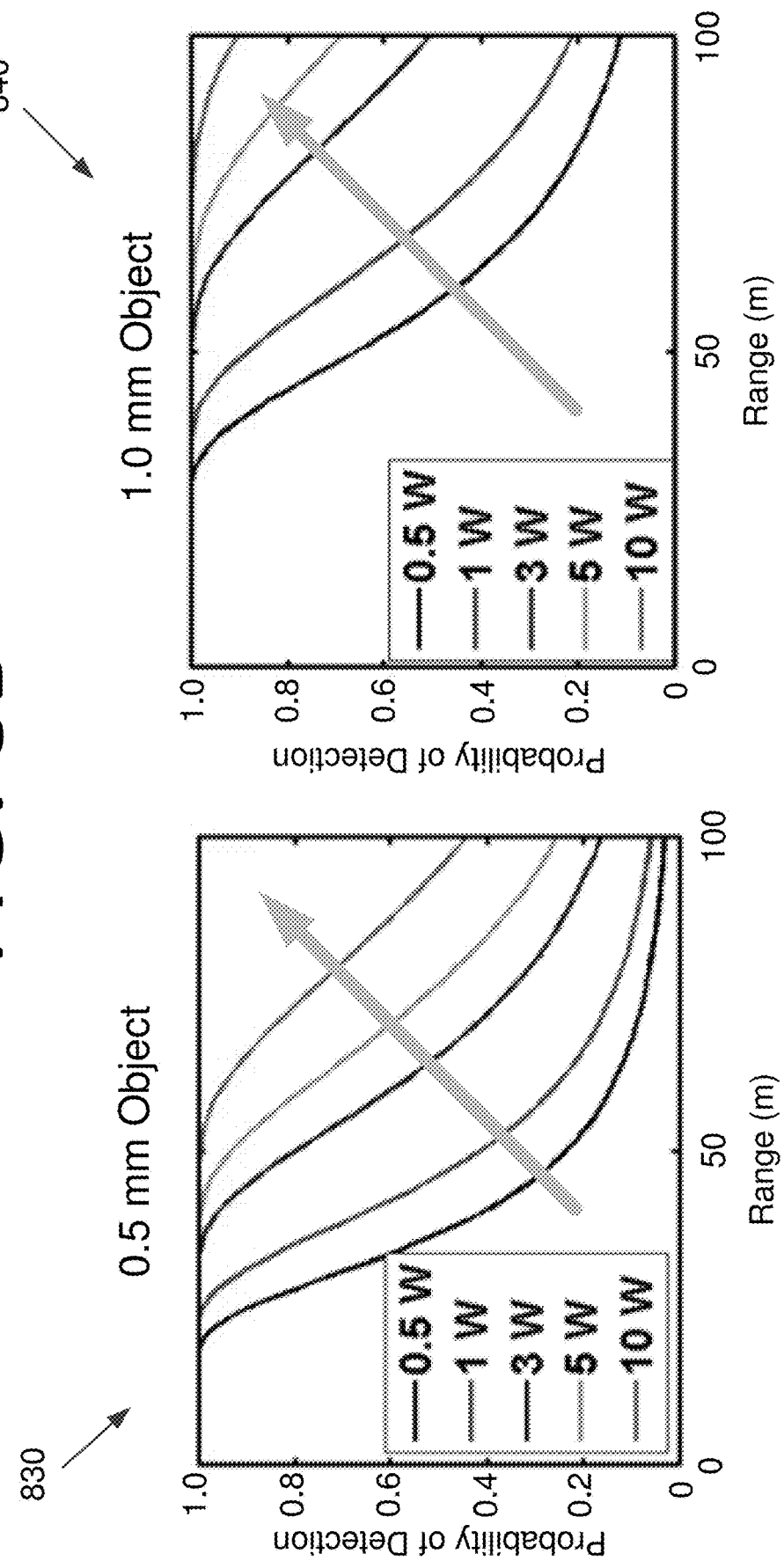
FIG. 8B illustrates graphs of fan beam detection probabilities at distances in meters for an 800 nm pulsed laser for objects of 0.5 mm (left) and 1 mm (right) diameters, according to an embodiment of the present invention.

FIG. 8B illustrates graphs 830, 840 of fan beam detection probabilities at distances in meters for an 800 nm pulsed laser diode for objects of 0.5 mm and 1 mm diameters, respectively, according to an embodiment of the present invention. Graphs 830, 840 assume a probability of false alarm of 1 in 100 ($10^{-2}$). With a 10 W laser, objects with a 0.5 mm diameter can be detected at ranges in excess of 50 meters, as shown in graph 830. With a 3 W laser, objects with a 1.0 mm diameter can be detected at ranges in excess of 50 meters, as shown in graph 840.

Figure 8C:
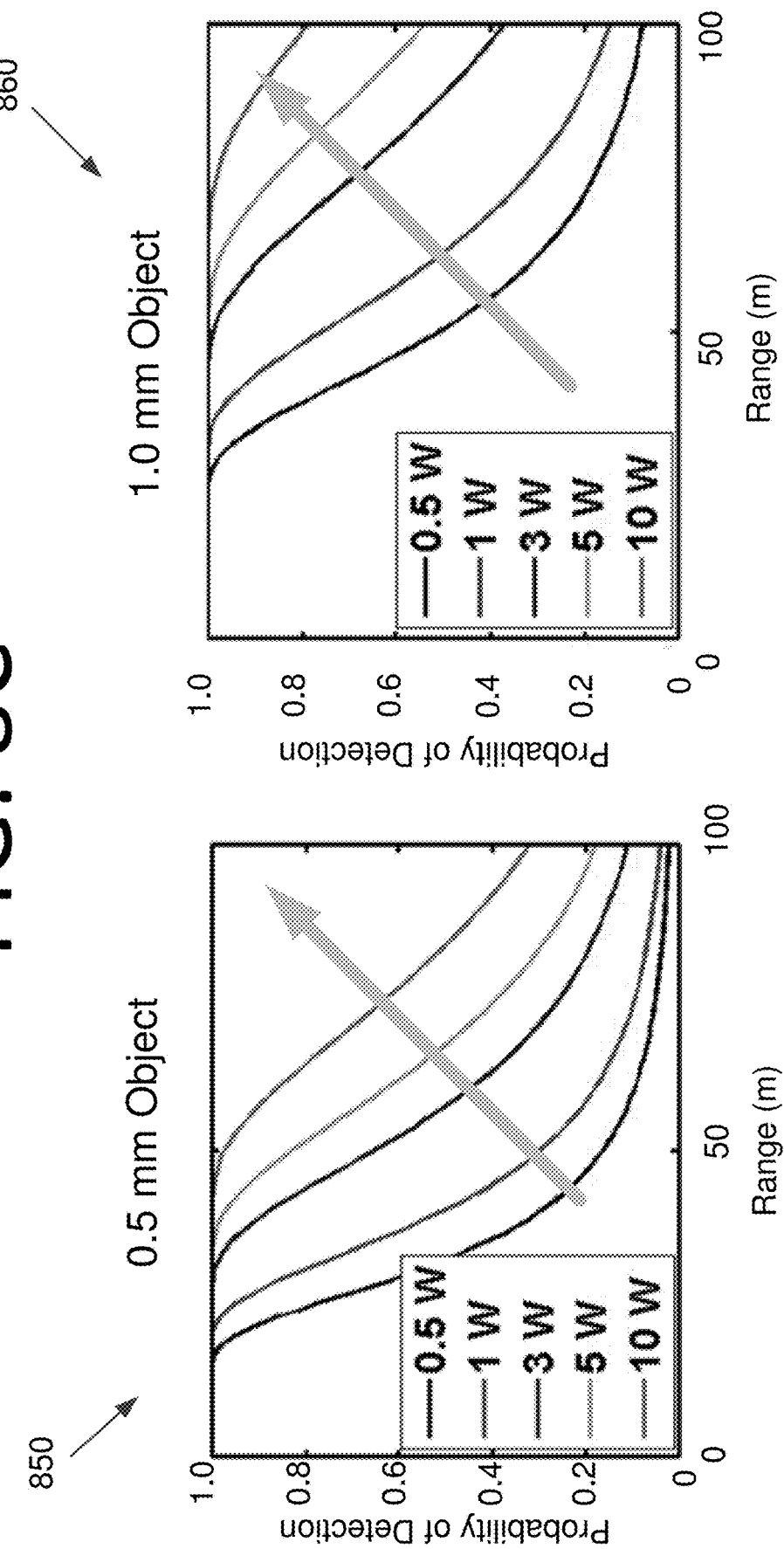
FIG. 8C illustrates graphs of fan beam detection probabilities at distances in meters for a 1,064 nm pulsed fiber laser for objects of 0.5 mm (left) and 1 mm (right) diameters, respectively, according to an embodiment of the present invention.

FIG. 8C illustrates graphs 850, 860 of fan beam detection probabilities at distances in meters for a 1,064 nm pulsed fiber laser for objects of 0.5 mm and 1 mm diameters, respectively, according to an embodiment of the present invention. As with FIG. 8B, Graphs 850, 860 assume a probability of false alarm of 1 in 100 ($10^{-2}$). As can be seen in graph 850, a 10 W laser is needed to detect objects with a 0.5 mm diameter ranges of 50 meters. With a 3 W laser, objects with a 1.0 mm diameter can be detected at ranges in excess of 50 meters, as shown in graph 860.

Figure 8D:
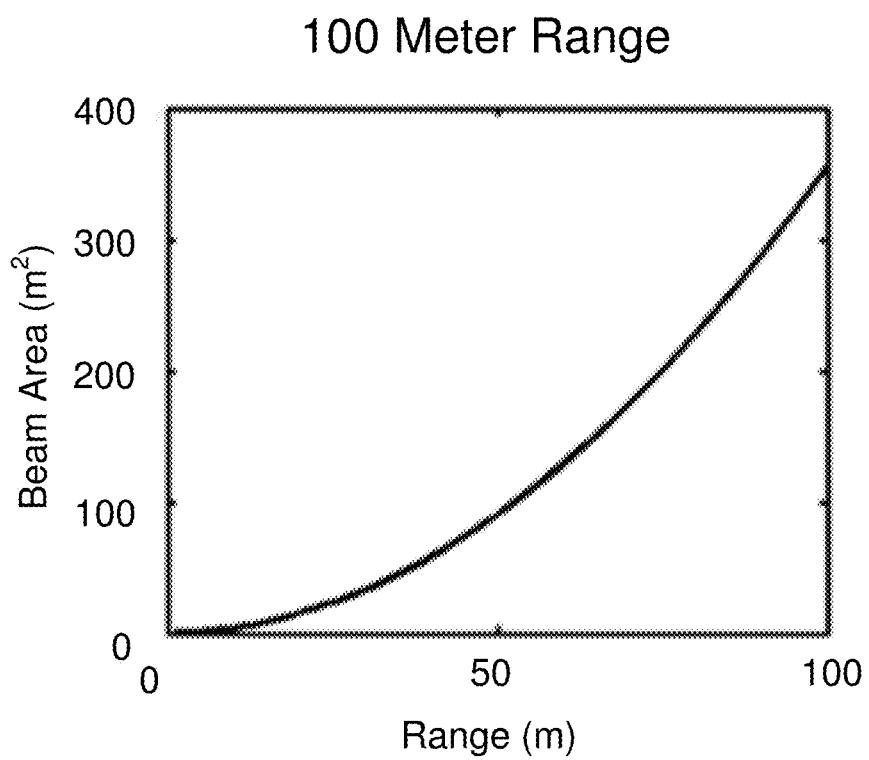
FIG. 8D is a graph illustrating beam area at ranges of up to 50 meters (left) and up to 100 meters (right), according to an embodiment of the present invention.

In some embodiments, a beam area of approximately 100 m² may be required to perform useful surveys of small objects at a range of 50 meters. FIG. 8D is a graph 870 illustrating beam area at ranges of up to 100 meters, according to an embodiment of the present invention. Assuming a surface area of a right elliptical cone with a height of ~50 meters, the 100 m² requirement for surface area can be reached with an 800 nm pulsed laser diode.

It should be noted that in FIGS. 8B and 8C, the gray arrows in the graphs illustrate the direction of increasing power. In other words, the curve closest to the head of the arrow has the highest power (10 W), the next curve from the head of the arrow has the second highest power (5 W), etc.

Per the above, some embodiments employ a cylindrical lens that generates a fan beam swept out by a radiating pulse. Both 800 nm and 1064 nm lasers could be effective for some embodiments. A 10 W laser could reach a range of 50 meters and observe 0.5 mm particles with a 99% detection probability. A 3 W laser could reach a range of 50 meters and observe 1 mm particles with a 99% detection probability. A 10 W laser could also reach a range of 100 meters and observe 1 mm particles with an 80% probability. Such embodiments could be used to survey the debris field for an orbit over a desired period of time (e.g., one year). Such a survey could assist in determining whether ORDEM or Master09 is more accurate for small particle detection, for example.

Space Situational Awareness Sensor

Some embodiments provide a LIDAR-based sensor system that can be mounted to any desired space vehicle platform to provide space situational awareness for approaching debris. This functionality could also be provided by interconnected small satellites that capture the velocity vector of a piece of debris. Such a system could allow categorization of debris and/or provide self-awareness of the debris field and debris velocities around the satellite(s).

FIG. 9 illustrates a system of interconnected small satellites 900 that are configured to perform LIDAR-based debris detection, according to an embodiment of the present invention. In some embodiments, satellites 900 may be satellite 700 of FIG. 7A or 7B, for example. One goal of the embodiment depicted in FIG. 9 is to show an example of how a LIDAR-based system can measure the surrounding environment and provide a degree of situational awareness of oncoming debris. For this example, it is assumed that the interconnected system of satellites is travelling in orbit in the direction to the right in FIG. 9. Moreover, an x-y-z axis system is defined where the x-axis is horizontal along FIG. 9 (i.e., left to right) and parallel to the direction of travel of satellite system 900. The y-axis is defined as normal to the direction of travel (i.e., the x-axis) and visually extending into and out from FIG. 9. Finally, the z-axis is defined as normal to both the x-axis y-axis, which is vertical in FIG. 9 from top to bottom.

System 900 is made up of multiple small satellites, including framework LIDAR satellites 910 and framework satellites 920. In this embodiment, there are three LIDAR satellites 910—one located in the middle of system 900 and the others located at each end. Each LIDAR satellite 910 in this embodiment has its own laser source at a different laser wavelength than the other LIDAR satellites and a detector that is sensitive to only that wavelength (e.g., via sharp narrow band filters). In effect, each LIDAR operates on its own signal "channel". Also, each LIDAR satellite 910 in this embodiment produces a rotating beam of pulsed laser light within a plane (e.g., the end LIDAR along the x-z plane, the middle LIDAR along the y-x plane, and the front LIDAR along the y-z plane). The laser beams can be any desired shape (e.g., fan, line, etc.), but the rotation is within the defined plane. A piece of debris located at a distance L is shown in FIG. 9, and in this example, the LIDAR in the front and middle of system 900 are able to scatter off the debris. When the return signal is plotted for all three channels as a function of time, the return from the two LIDARs will give a more precise debris localization. The improved precision may be derived from geometric triangulation if the debris is monitored on three channels, or when the three channels are measured as a function of time as the signal return or calculated range-to-debris changes as measured by the three channels.

Debris Velocimetry

Figure 10:
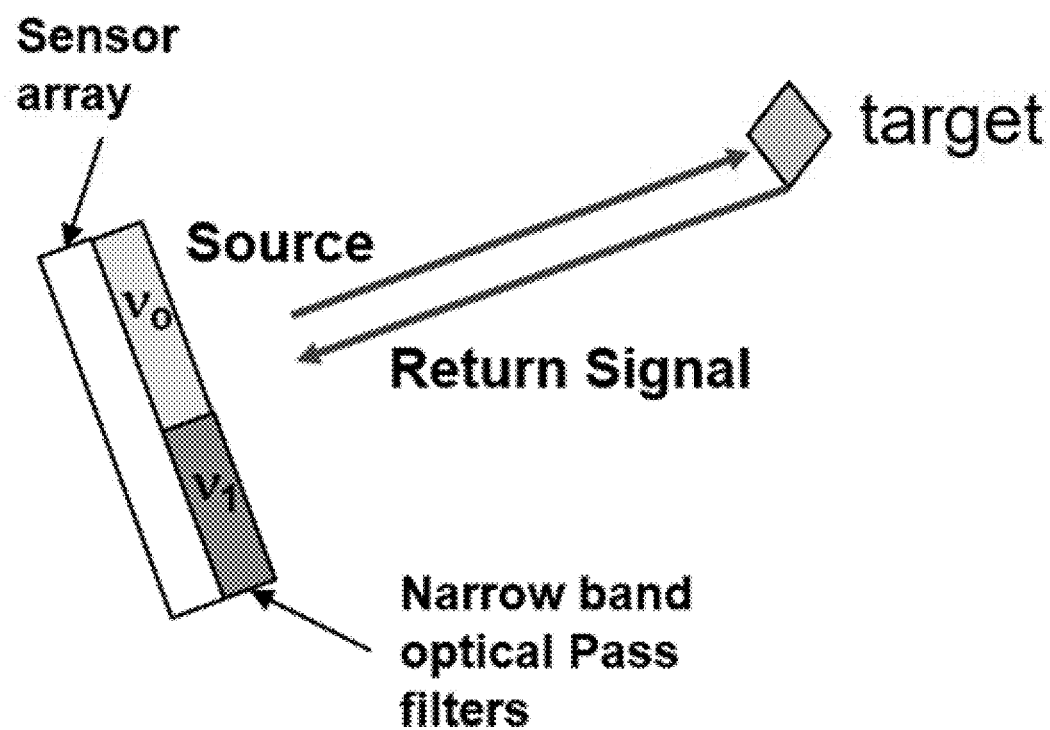
FIG. 10 illustrates a sensor array with two filters for different wavelengths used for debris velocimetry, according to an embodiment of the present invention.

Debris velocimetry may be determined in some embodiments using two-pulse excitation. This involves sending two laser pulses separated by a fixed time at wavelengths of $\lambda_0 = c/v_0$ and $\lambda_1 = c/v_1$. The signal returns at $\lambda_0$ and $\lambda_1$ are each collected on two separate sensors or on one sensor with two filters (one for each wavelength). The latter scenario is illustrated in sensor array 1000 of FIG. 10. In some embodiments, sensor array 1000 may be part of or operably connected to satellite 700 of FIG. 7A or 7B, for example.

Figure 11:
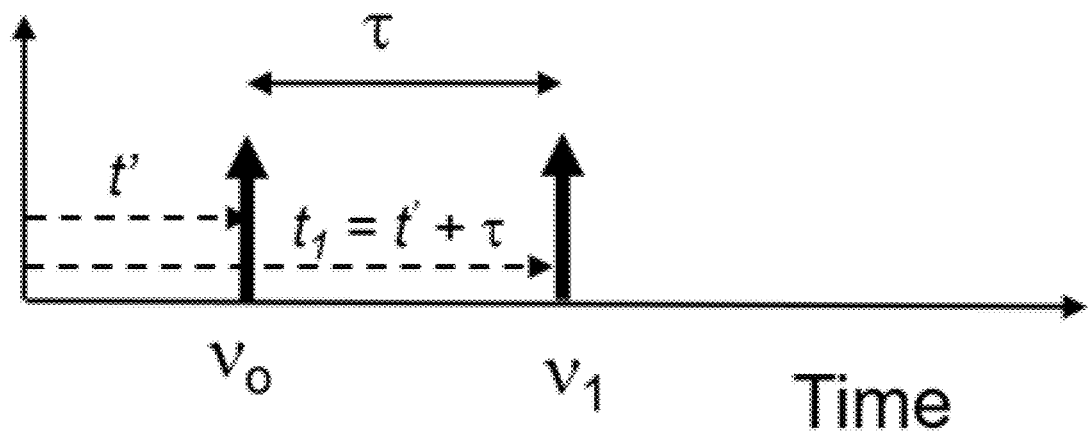
FIG. 11 is a graph illustrating the timing of two laser pulses that are at different wavelengths (i.e., frequencies) used for debris velocimetry, according to an embodiment of the present invention.

The return signal arrival times are measured. Based on this measurement, the range R and the target motion "velocity" V are calculated. $t_{r0}$ and $t_{r1}$ are relative to an initial start time t' (which can vary for an asynchronous camera) and a delay τ, which can vary for an asynchronous camera. The timing of the two laser pulses is illustrated in graph 1100 of FIG. 11, where two laser pulses are separated by τ. In FIG. 11, each laser pulse is at a different wavelength. However, for the purposes of explanation, assume that each laser pulse is at the same wavelength.

The ranges $R_0$ and $R_1$ and the target motion velocity V are given by the following equations:

$$R_0 = \frac{1}{2} c(t_{r0} - t') \quad (4)$$

$$R_1 = \frac{1}{2} c(t_{r1} - (t' + \tau)) \quad (5)$$

$$V = \frac{(R_1 - R_0)}{\tau} \quad (6)$$

If V>0, the target is moving away from the sensor. If V<0, the target is coming toward the sensor.

V has a lower limit that depends on the range R, the laser spot size at range R (i.e., how large of an area the laser illuminates at that range), the time-binning window of the sensor, and the delay τ. To measure a change in target velocity given a delay of duration τ, the target must move outside an error-ellipsoid that has a length on the order of the laser spot size diameter at range R and width w, given by w=cτ. The laser spot size is typically fixed by the telescope. For instance, for a laser divergence of 10 μrad, which is a 10 cm diameter exit beam width telescope, the laser spot size at 500 km is ~10 meters in diameter.

If the optical delay τ can be swept between the two laser pulses, then more information can be captured. "Sweeping" the optical delay means that the optical delay is varied repeatedly while the signal is measured synchronously with the delay sweep. It may be practical to consider two laser beams that are time-synchronized. However, an alternative is a more complex single laser that produces two laser pulses with a variable time delay. The longer τ is, the farther the range is from which information on V can be derived. If the target is in a circular orbit at a range of 500 km parallel to the space-borne laser source and is moving at ~8 km/s, then r values of approximately 1.25 ms are needed. These delays are possible via two-pulsed lasers. So, if each laser pulse has a repetition rate of 100 kHz, and the delay is moved between each pulse firing (e.g., 100 ns), this would mean 12,500 data points or delay segments. For 100 kHz, it would take 0.125 sec. A velocity vector of the identified debris can thus be generated from the return-scattered photons as:

$$\left(\begin{bmatrix} x_2 \\ y_2 \\ z_2 \end{bmatrix} - \begin{bmatrix} x_1 \\ y_1 \\ z_1 \end{bmatrix}\right) / \Delta t = \begin{bmatrix} v_x \\ v_y \\ v_z \end{bmatrix} \quad (7)$$

It should be noted that if the sensor array is gated, the gate should be moved to measure a segment of the possible range. If the sensor runs in asynchronous mode, there is no need to worry about the gate, but more memory will be needed. This is because the signals from R=0 to R will all arrive in a stream.

Lida-Based System using Mie Scattering and Two Cooperative Space Vehicles

Unlike Rayleigh scattering, Mie scattering is not strongly wavelength-dependent. Mie scattering has a strong forward scattering component, but it also has off-angle scattering that varies with angle. Perhaps more importantly, there is a strong "fluctuation" in the polarization in the off-axis scattered light. Polarization fluctuations increase as the refractive index of the material increases (e.g., for metals). The refractive index itself increases as the wavelength increases into the IR spectrum.

Link budget data suggests that particles down to 200 μm×200 μm can be detected at 15 km. At 10 km, debris down to 100 μm×100 μm can be qualitatively identified. By flying two space vehicles (e.g., satellites) at different orbits approximately 10 km apart, where one serves as the pulsed laser source and the other serves as the sensor, debris detection using Mie scattering can be achieved. The space vehicles may be synchronized to 1 ns and know their relative locations.

Figure 12:
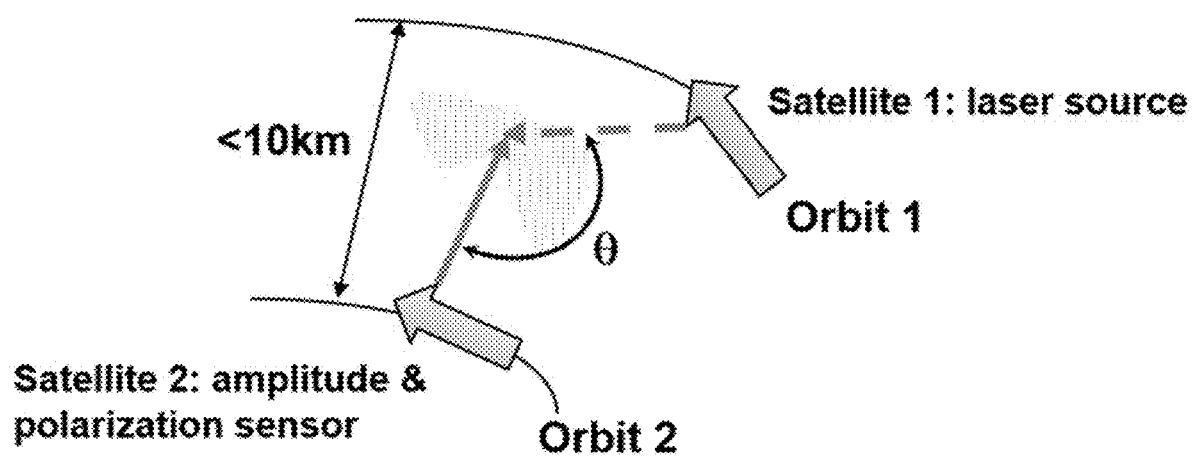
FIG. 12 illustrates an example of LIDAR-based detection using Mie scattering with two satellites in orbits 10 km apart, according to an embodiment of the present invention.

Such an example 1200 with satellites is shown in FIG. 12. In some embodiments, the satellites of FIG. 12 may be satellite 700 of FIG. 7A or 7B, for example. The laser source satellite has a relative velocity that is somewhat faster than the sensor satellite in this example. The laser source satellite "pings" using a pulsed laser in a particular direction. Both the direction and when the laser is fired are communicated to the sensor satellite.

The sensor satellite has a relatively narrow angle field of view telescope with a polarizer on the sensor(s). Commercial polarizers come in various varieties and can be narrow or broad band with regards to wavelength (e.g., linear, half wave, quarter wave, etc.). Linear polarizers may be preferred in some embodiments, which come as coatings on optics, materials that have unique polarization properties, and/or various physical optics that have polarizing properties. A linear polarizer in the range of the optical wavelength range only allows photons with the specific polarization (i.e., electric field) to pass through. The observation direction (i.e., the vector) and the laser direction vector form an angle θ. As the laser source satellite moves past the sensor satellite and maintains the laser direction, a volume of space between the two orbits is interrogated.

The laser source and detector are two known location points in space. Imagine these two locations as the two bottom vertices of an isosceles triangle. Using the triangle analogy, the detector is positioned to observe at a location where the third vertex of the isosceles triangle would be located. Moreover, the laser source and sensor are time synchronized in some embodiments such that upon the sensor receiving a LIDAR return signal. it can calculate the distance to the scattering point due to the strategic location of the sensor and laser source. Because the sensor and laser source locations are known, the distance between these two entities can be derived. Also, because the source and sensor are time synchronized in some embodiments, the received signal constitutes the travel time of the laser photons from the source to the sensor, which define the distance of the two "legs" of the isosceles triangle. Geometry is then used to capture the angles of the triangle.

Underwater Detection

A significant problem that has gained attention recently is the existence of gyres of waste in the oceans due to currents. The "Great Pacific Garbage Patch" has received the most attention. This gyre is twice the size of Texas, and plastic has been found up to 9 feet deep. However, gyres of garbage also have been discovered in the east, west and south Pacific, the north and south Atlantic, and the Indian ocean.

The majority of the debris in these gyres is non-biodegradable plastic. Rather than biodegrading, this plastic waste breaks down into smaller and smaller pieces. Some of these pieces are then consumed by fish, birds, and other wildlife. Studies by the Scrips Institution of Oceanography in California estimate that 5-10% of fish contain small pieces of plastic. In some cases, consumption of plastic is fatal. Deaths due to plastic consumption have been observed in albatross chicks on Midway Island, for example.

In order to better understand the depth, locations, and object compositions and sizes of these gyres, some embodiments of the present invention may be used to survey and/or collect the debris. LIDAR-based sensors may be attached to a drone, submarine, or ship, for example, and used to identify characteristics of the debris. While speed is a significant consideration for space-based embodiments, where objects may be traveling at speeds on the order of ones to tens of kilometers per second with respect to a spacecraft, this is naturally not the case for ocean-based debris. Rather, debris generally only moves due to ocean currents, wave motion (if it is close enough to the surface wave action), and possibly due to being disturbed by a ship or other craft. As such, an even weaker laser than used in space-based embodiments may still be effective. However, since sunlight entering ocean water only travels to a depth of approximately 1,000 meters, and there is rarely any significant light beyond 200 meters, a higher power laser may be beneficial in order to extend the effective depth and distance at which debris can be detected. The use of a blue or blue-green (or cyan) wavelength laser would likely also penetrate water better than other wavelengths, which tend to be absorbed more quickly. Blue light has a wavelength of 450 to 485 nm and a frequency of 619 to 667 terahertz (THz). Blue-green light has a wavelength of 485 to 500 nm and a frequency of 600 to 619 terahertz (THz).

While certain embodiments of the LIDAR-based sensors may be mounted to flying drones in order to survey more quickly, since weight is much less of a consideration in the ocean, embodiments attached to a ship or submarine (whether manned or unmanned) could potentially be larger, more powerful, and have a longer effective operating time before needing to recharge, refuel, etc. Such embodiments could include many sensors and powerful/complex computing systems that would be effective at detecting and cataloging the relatively large number of objects that are located close to one another in these gyres or any other desired aquatic location (e.g., seas, lakes, rivers, bays, etc.).

The U.S. Navy is considering the use of blue or blue-green lasers for point-to-point underwater optical communications. Technologies that support optical underwater communications could also be applied as part of a novel LIDAR-based system in aquatic embodiments (e.g., compensating for water temperature gradients that locally change the optical index and bend light). While in space debris measurements the signals will tend to be single hits due to relatively low density, it is estimated that the LIDAR measurement underwater could yield both single scatter points or a response from a large number of scatters in a volume (e.g., a school of fish with good optical surface reflection). Consequently, the detector and the mechanism by which data is acquired/binned/stored would tend to differ somewhat from space-based embodiments. Given the relatively short distances between the debris and the detector as compared to some space applications, the detector should be very fast in some embodiments, latching at sub-nanosecond or picosecond accuracy. The laser pulse width should also be short (e.g., in the picosecond or femtosecond bandwidth). Rather than using a single detector element, an array of detector elements (e.g., a CCD) may be used in some embodiments, where along each row of the array, the return signals are captured and binned as a function of time, and each row represents data from a new position location of the LIDAR laser beam.

Consider the analogy of an analog clock with a second hand dial, where the dial represents the laser beam pointing to a particular location. While the "second hand" is temporarily fixed, the return data as a function of time is binned into the horizontal array elements. The "second hand" then moves, and a new row is populated. After 60 seconds of motion, a "data cube" volume of stored information would have been acquired that reflects the scatter points in a volume of water about the LIDAR-based system.

In some embodiments, the laser wavelengths may be "tuned" to the optical properties of common plastics, for example. This could allow the system to distinguish plastic from other objects or animals floating in the water. Once identified, the system could then collect the plastic debris via a vacuum and storage tank, for example. A fleet of such lidar-based robots could collect plastic from substantial volumes of water, and then return to a tender ship or port to deposit the plastic, where it can be transported to a landfill, burned, and/or recycled.

Atmospheric Detection

Detection of particles in the atmosphere may also be of interest. For instance, it may be desirable to measure different types of pollutants, survey the concentration and thickness of the ozone layer, detect and survey plumes of volcanic ash in the atmosphere, etc. In a practical example of the latter, in 2010, the eruption of the Eyjafjallajökull volcano in Iceland caused the largest air traffic shutdown in Europe since World War II over concerns that the ejected volcanic ash may damage aircraft engines.

As such, some embodiments may detect the sizes, characteristics, and concentrations of particles in desired layer(s) and/or portion(s) of layer(s) of the atmosphere (i.e., the troposphere, stratosphere, mesosphere, thermosphere, and/or exosphere). Per the above, embodiments of the present invention employ LIDAR-based techniques. As such, embodiments function as a ranging device that can be modified to also serve as an optical spectrometry tool. For example, molecular species in the atmosphere can be sensed by a technique called laser induced fluorescence (LIF), where the LIDAR laser is tuned to the atomic or molecular excitation band of a given atom or molecule, and the resulting emission is detected in a similar manner to the LIDAR-based approaches described above. Depending on the SNR, this could be achieved from space to the upper atmosphere, or from the ground up. Materials in the atmosphere that are refractory would be difficult to detect if they absorb light and do not re-emit (e.g., dark colored substances such as volcanic ash). However, if the LIDAR source and detector are separated, this can be compensated for.

Using the example of the eruption of the Eyjafjallajökull volcano in Iceland, a system may employ two drones—one carrying a LIDAR source and the other carrying a detector. The source and the detector may be separated by many kilometers and fly along a parallel path, where the detector is trained to look at the source. The LIDAR data from such a fly-by could show where ash is located by inference due to the fact that the photons from the source never made it to the detector due to being absorbed by the ash.

It should be noted that some embodiments may be used to track much larger objects, such as birds. Embodiments mounted to an aircraft, for example, could detect individual birds or flocks, as well as their direction of travel, at distances of one to ten kilometers, for example, and then either inform the pilot(s) or cause the aircraft to modify its flight path to maintain a safe distance from the birds. Such embodiments may give notice of a few seconds to a minute, for example, to react to such objects, aircraft, or animals, depending on the speed of the aircraft. Such embodiments may also detect changes in direction of travel of the birds and periodically or continuously modify the attitude of the aircraft accordingly in real time or near-real time.

Figure 13:
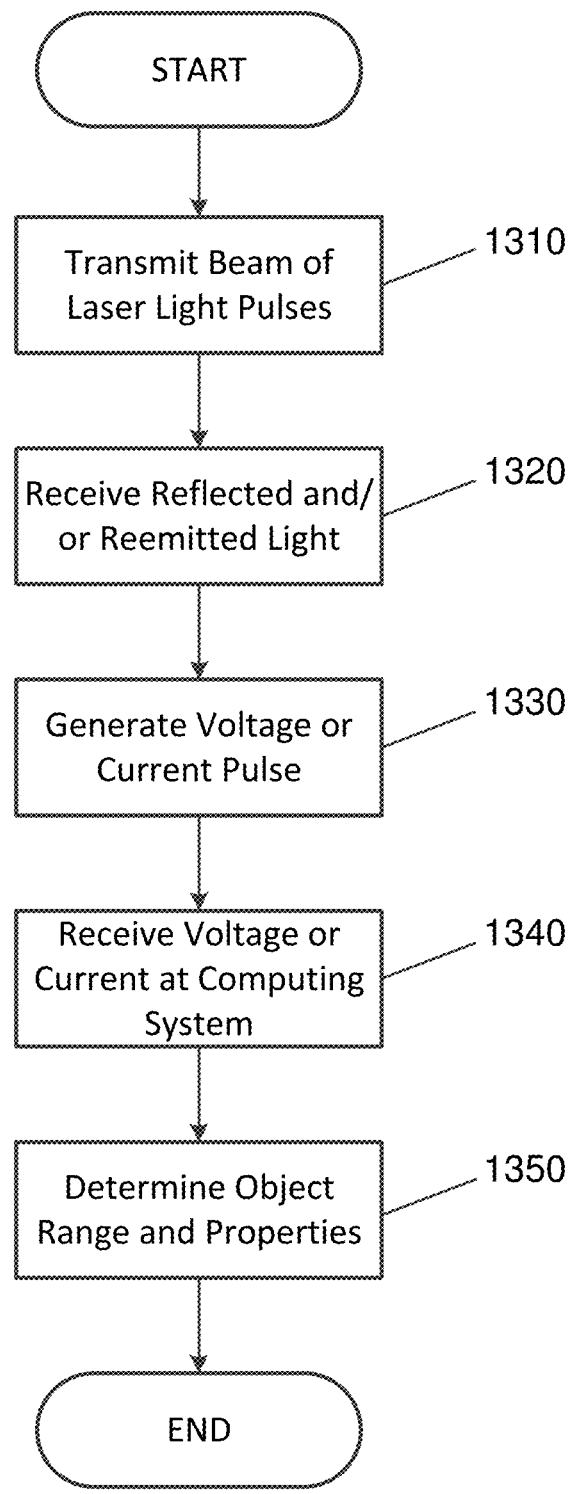
FIG. 13 is a flowchart illustrating a process for performing debris detection and characterization using a LIDAR-based sensor, according to an embodiment of the present invention.

FIG. 13 is a flowchart illustrating a process 1300 for performing debris detection and characterization using a LIDAR-based sensor, according to an embodiment of the present invention. The process includes transmitting a beam that includes laser light pulses at a predetermined wavelength and frequency at 1310. The laser light pulses reflect off of and/or are absorbed and reemitted by an object. This reflected and/or reemitted light is then received by a light-sensitive receiver at 1320, and the light-sensitive receiver generates a voltage or current from the received light at 1330. The voltage or current is received by a computing system at 1340 (e.g., computing system 1400 of FIG. 14). The computing system then determines object properties, such as location, distance, velocity, size, rotation, material properties, or any combination thereof, from the voltage or current received from the at least one light-sensitive receiver at 1350. The location, distance, velocity, size, rotation, and/or material properties may be determined via the techniques disclosed herein.

Figure 14:
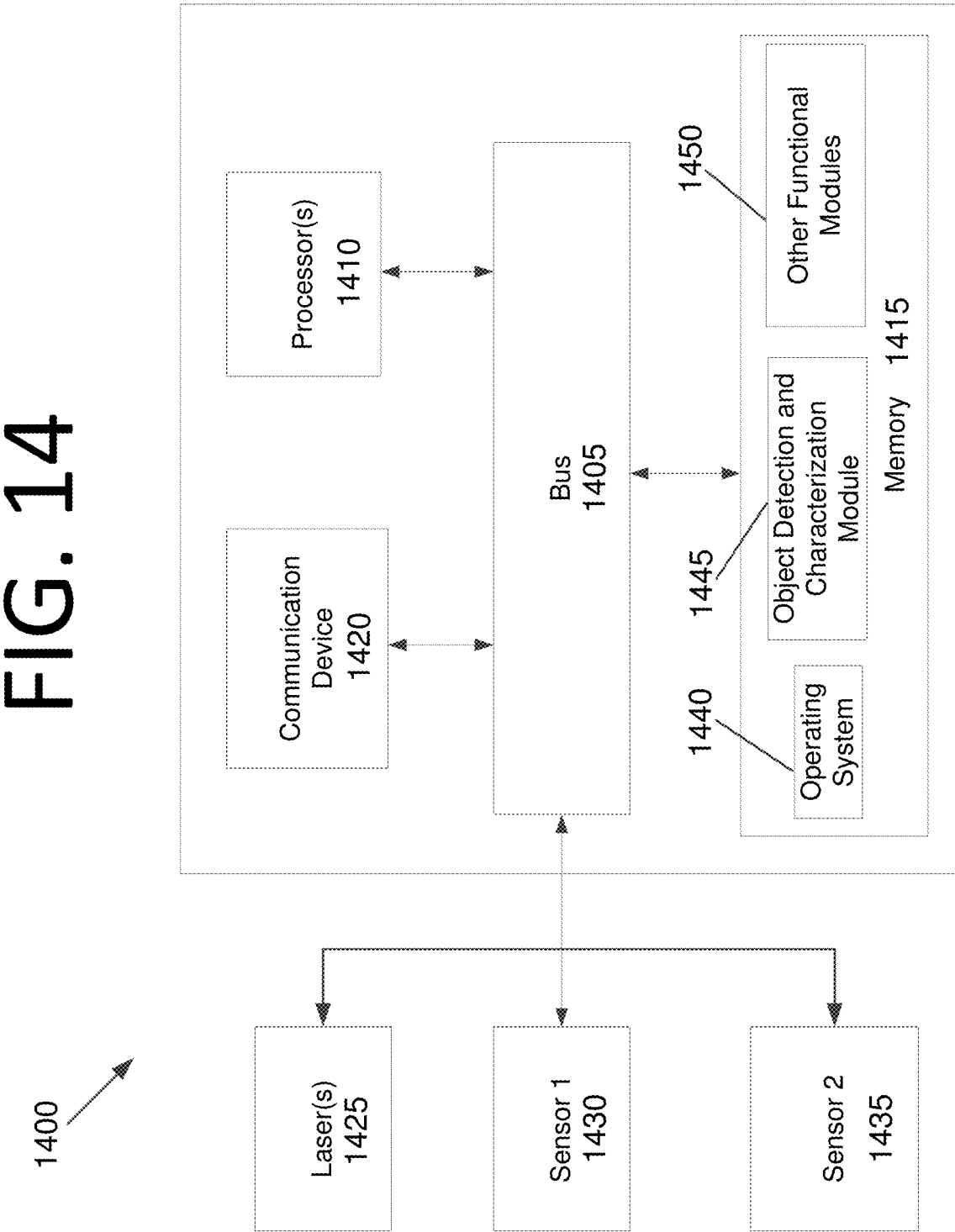
FIG. 14 is a block diagram illustrating a computing system configured to perform LIDAR-based debris detection and characterization, according to an embodiment of the present invention.

FIG. 14 is a block diagram illustrating a computing system 1400 configured to perform LIDAR-based debris detection and characterization, according to an embodiment of the present invention. Computing system 1400 includes a bus 1405 or other communication mechanism for communicating information, and processor(s) 1410 coupled to bus 1405 for processing information. Processor(s) 1410 may be any type of general or specific purpose processor, including, but not limited to, a central processing unit (CPU), as system on a chip (SoC), and/or an application specific integrated circuit (ASIC). Processor(s) 1410 may also have multiple processing cores, and at least some of the cores may be configured to perform specific functions. Multi-parallel processing may be used in some embodiments. Computing system 1400 further includes a memory 1415 for storing information and instructions to be executed by processor(s) 1410. Memory 1415 can be comprised of any combination of random access memory (RAM), read only memory (ROM), flash memory, cache, static storage such as a magnetic or optical disk, or any other types of non-transitory computer-readable media or combinations thereof. Non-transitory computer-readable media may be any available media that can be accessed by processor(s) 1410 and may include volatile media, non-volatile media, removable media, and/or non-removable media. Additionally, computing system 1400 includes a communication device 1420, such as a transceiver and antenna, a network card, etc. to wirelessly provide access to a communications network.

Processor(s) 1410 are further coupled via bus 1405 to laser(s) 1425 (e.g., multiple lasers at different wavelengths in some embodiments) that emit laser pulses for detecting objects. Sensors 1430, 1435 detect laser light returning after striking an object. For instance, sensor 1430 may detect light at a first wavelength and sensor 1435 may detect light at a second wavelength. However, in some embodiments, only one sensor is included, and in certain embodiments, more than two sensors are included. In certain embodiments, the functionality of sensor 1430 and sensor 1435 is incorporated into a single sensor via filtering. It should be noted that any desired number and type of sensors may be included without deviating from the scope of the invention.

Memory 1415 stores software modules that provide functionality when executed by processor(s) 1410. The modules include an operating system 1440 for computing system 1400. The modules further include an object detection and characterization module 1445 that is configured to perform debris detection and characterization by employing any of the approaches discussed herein or derivatives thereof. Computing system 1400 may include one or more additional functional modules 1450 that include additional functionality.

One skilled in the art will appreciate that a "system" could be embodied as an embedded computing system, a personal computer, a server, a console, a cell phone, a tablet computing device, or any other suitable computing device, or combination of devices. However, when on a remote craft, the system would likely be an onboard embedded system, a flight computer, etc. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A light detection and ranging (LIDAR)-based system, comprising:
at least one laser configured to transmit a beam comprising light pulses at a predetermined wavelength and pulse repetition rate;
at least one light-sensitive receiver configured to:
receive light from the beam of light pulses after being reflected off of an object, reemitted after absorption by the object, or both, and
generate a voltage or a current from the received light; and
a computing system configured to receive the generated voltage or current from the at least one light-sensitive receiver and determine, for the object, a location, a distance, a velocity, a change in velocity, a size, a rotation, material properties, or any combination thereof, from the voltage or current received from the at least one light-sensitive receiver, wherein
the pulse repetition rate is set such that the object will be contacted by pulses at least twice when traveling through the volumetric distribution of laser energy at a maximum relative orbital velocity, the beam optimized for surface area.

2. The LIDAR-based system of claim 1, wherein the at least one laser and the at least one light-sensitive receiver are located on a same vehicle.

3. The LIDAR-based system of claim 1, wherein the at least one laser and the at least one light-sensitive receiver are located on different vehicles.

4. The LIDAR-based system of claim 1, wherein the computing system is configured to determine a distance d to the object via:

$$d = \frac{t * c}{2}$$

where c is the speed of light and t is a time between transmission of the beam by the at least one laser and detection of the reflected and/or reemitted light from the object by the at least one light-sensitive receiver.

5. The LIDAR-based system of claim 4, wherein the object location is determined by using a current location of the LIDAR-based system as a starting point for a vector of length d in a direction of the object, an endpoint of which gives the object location.

6. The LIDAR-based system of claim 1, wherein the object velocity V is calculated based on measured return signal arrival times as follows:

$$R_0 = \frac{1}{2}c(t_{r0} - t')$$

$$R_1 = \frac{1}{2}c(t_{r1} - (t' + \tau))$$

$$V = \frac{(R_1 - R_0)}{\tau}$$

where $t_{r0}$ and $t_{r1}$ are receive times of two laser pulses, t' is a transmit time of a first laser pulse of the two laser pulses, $\tau$ is a time delay between the two laser pulses, $R_0$ and $R_1$ are ranges at the times $t_{r0}$ and $t_{r1}$, and c is the speed of light.

7. The LIDAR-based system of claim 1, wherein the object size is determined by measuring a count of photons scattered from a same location during a period of time and relating the count to a physical cross section of the object.

8. The LIDAR-based system of claim 1, wherein the rotation of the object is determined by:
comparing a wavelength and frequency of light received by the at least one light-sensitive receiver to a wavelength and frequency of the beam transmitted by the at least one laser;
determining whether the received light is Doppler-shifted towards blue, red, or both; and
calculating a rotation rate of the object based on a degree of Doppler shift towards blue, red, or both.

9. The LIDAR-based system of claim 1, wherein the material properties of the object are determined by measuring a reflectivity R of laser light returning from the object at multiple wavelengths given by:

$$R = \frac{(\varepsilon^{1/2} - 1)^2}{(\varepsilon^{1/2} + 1)^2}$$

where $\varepsilon$ is a dielectric constant of a material.

10. The LIDAR-based system of claim 1, wherein an intensity distribution within the shape comprises a Gaussian or flat-top shape.

11. The LIDAR-based system of claim 1, wherein the at least one light-sensitive receiver comprises a telescope.

12. The LIDAR-based system of claim 1, wherein the at least one light-sensitive receiver comprises a lens and a photodetector, the lens configured to focus the received light onto the photodetector.

13. The LIDAR-based system of claim 12, wherein a diameter of the beam matches a field of view (FOV) of the photodetector.

14. The LIDAR-based system of claim 1, wherein the system comprises a plurality of vehicles that are interconnected.

15. The LIDAR-based system of claim 14, wherein the plurality of vehicles comprise two or more LIDAR vehicles and at least one framework vehicle connecting the two or more LIDAR vehicles.

16. The LIDAR-based system of claim 15, wherein each LIDAR vehicle comprises:
a laser of the at least one laser that emits a beam at a unique laser wavelength; and
a light-sensitive receiver of the at least one light-sensitive receiver that is sensitive to the unique wavelength of the laser, wherein
the unique laser wavelength of the beam and the sensitivity of the receiver to the unique wavelength constitute a unique channel for the respective LIDAR vehicle.

17. The LIDAR-based system of claim 16, wherein each LIDAR vehicle transmits a rotating beam of pulsed laser light within a plane that is different than those defined by rotating beams of other LIDAR vehicles in the system.

18. The LIDAR-based system of claim 17, wherein
the transmitted rotating beams from the LIDAR vehicles provide a return signal after reflecting off of the object and/or being reemitted by the object, and
the computing system is configured to plot the return signal for each channel as a function of time to calculate the location more precisely.

19. The LIDAR-based system of claim 1, wherein the computing system is configured to determine velocimetry of the object using two-pulse excitation, the two-pulse excitation comprising:
transmitting two laser pulses, by the at least one laser, that are separated from one another by a fixed optical delay;
collecting signal returns from the transmitted two laser pulses, by the at least one detector;
measuring arrival times of each signal return, by the computing system; and
calculating a range and object motion velocity based on this measurement, by the computing system.

20. The LIDAR-based system of claim 1, wherein the system comprises:
a laser source vehicle comprising the at least one laser; and
a detector vehicle comprising the at least one light-sensitive receiver, the at least one light-sensitive receiver comprising a telescope with a polarizer, wherein
the detector vehicle has a relative velocity with respect to the laser source vehicle,
the laser source vehicle communicates a direction of the at least one laser and when a respective beam of light from the at least one laser will be transmitted, and
the computing system, based on the voltage or current produced by the received light after passing through the telescope and polarizer and interacting with the light-sensitive receiver, is configured to determine an angle from an observation direction vector and a laser direction vector.

21. The LIDAR-based system of claim 1, wherein a Mie scattering model is used to derive the size of debris.

22. The LIDAR-based system of claim 1, wherein multiple lasers are used, each of the multiple lasers configured to transmit a different respective wavelength.

23. A computer-implemented method, comprising:
receiving a generated voltage or current from a light-sensitive receiver, by a computing system, the voltage or the current generated due to a fan beam with a pulse repetition rate set such that an object will be contacted by pulses at least twice when traveling through a volumetric distribution of laser energy of the fan beam at a maximum relative orbital velocity, the fan beam optimized for surface area; and
determining, for an object, a location, a distance, a velocity, a change in velocity, a size, a rotation, material properties, or any combination thereof, from the voltage or current received from the light-sensitive receiver.

24. The computer-implemented method of claim 23, wherein the computing system is configured to determine a distance d to the object via:

$$d = \frac{t*c}{2}$$

where c is the speed of light and t is a time transmission of the beam by the at least one laser and detection of the reflected and/or reemitted light from the object by the at least one light-sensitive receiver.

25. The computer-implemented method of claim 24, wherein the object location is determined by using a current location of the LIDAR-based system as a starting point for a vector of length d in a direction of the object, an endpoint of which gives the object location.

26. The computer-implemented method of claim 23, wherein the object velocity V is calculated based on measured return signal arrival times as follows:

$$R_0 = \frac{1}{2}c(t_{r0} - t')$$
$$R_1 = \frac{1}{2}c(t_{r1} - (t' + \tau))$$
$$V = \frac{(R_1 - R_0)}{\tau}$$

where $t_{r0}$ and $t_{r1}$ are receive times of two laser pulses, t' is a transmit time of a first laser pulse of the two laser pulses, $\tau$ is a time delay between the two laser pulses, $R_0$ and $R_1$ are ranges at the times $t_{r0}$ and $t_{r1}$, and c is the speed of light.

27. The computer-implemented method of claim 23, wherein the object size is determined by measuring a count of photons scattered from a same location during a period of time and relating the count to a physical cross section of the object.

28. The computer-implemented method of claim 23, wherein the object rotation is determined by determining a red shift or blue shift of an edge of the object moving toward the sensor and an edge of the object moving away from the of the object using a Doppler equation.

29. The computer-implemented method of claim 23, wherein the material properties of the object are determined by measuring a reflectivity R of laser light returning from the object at multiple wavelengths given by:

$$R = \frac{(\varepsilon^{1/2} - 1)^2}{(\varepsilon^{1/2} + 1)^2}$$

where $\varepsilon$ is a dielectric constant of a material.

30. A light detection and ranging (LIDAR)-based system, comprising:
a laser source vehicle comprising at least one laser, the at least one laser configured to transmit a beam comprising light pulses at a predetermined wavelength and pulse repetition rate;
a detector vehicle comprising at least one light-sensitive receiver, a telescope, and a polarizer, the at least one light-sensitive receiver configured to:
receive light from the beam of light pulses after being reflected off of an object, reemitted after absorption by the object, or both, and
generate a voltage or a current from the received light; and a computing system configured to receive the generated voltage or current from the at least one light-sensitive receiver and determine, for the object, a location, a distance, a velocity, a change in velocity, a size, a rotation, material properties, or any combination thereof, from the voltage or current received from the at least one light-sensitive receiver, wherein the detector vehicle has a relative velocity with respect to the laser source vehicle, the laser source vehicle communicates a direction of the at least one laser and when a respective beam of light from the at least one laser will be transmitted, and the computing system, based on the voltage or current produced by the received light after passing through the telescope and polarizer and interacting with the light-sensitive receiver, is configured to determine an angle from an observation direction vector and a laser direction vector.

31. The LIDAR-based system of claim 30, wherein the computing system is located on the detector vehicle.

32. The LIDAR-based system of claim 30, wherein the computing system is configured to determine a distance d to the object via:

$$d = \frac{t * c}{2}$$

where c is the speed of light and t is a time between transmission of the beam by the at least one laser and detection of the reflected and/or reemitted light from the object by the at least one light-sensitive receiver.

33. The LIDAR-based system of claim 32, wherein the object location is determined by using a current location of the LIDAR-based system as a starting point for a vector of length d in a direction of the object, an endpoint of which gives the object location.

34. The LIDAR-based system of claim 30, wherein the object velocity V is calculated based on measured return signal arrival times as follows:

$$R_0 = \frac{1}{2}c(t_{r0} - t')$$

$$R_1 = \frac{1}{2}c(t_{r1} - (t' + \tau))$$

$$V = \frac{(R_1 - R_0)}{\tau}$$

where $t_{r0}$ and $t_{r1}$ are receive times of two laser pulses, t' is a transmit time of a first laser pulse of the two laser pulses, $\tau$ is a time delay between the two laser pulses, $R_0$ and $R_1$ are ranges at the times $t_{r0}$ and $t_{r1}$, and c is the speed of light.

35. The LIDAR-based system of claim 30, wherein the object size is determined by measuring a count of photons scattered from a same location during a period of time and relating the count to a physical cross section of the object.

36. The LIDAR-based system of claim 30, wherein the rotation of the object is determined by:

comparing a wavelength and frequency of the light received by the at least one light-sensitive receiver to a wavelength and frequency of the beam transmitted by the at least one laser;

determining whether the received light is Doppler-shifted towards blue, red, or both; and calculating a rotation rate of the object based on a degree of Doppler shift towards blue, red, or both.

37. The LIDAR-based system of claim 30, wherein the material properties of the object are determined by measuring a reflectivity R of laser light returning from the object at multiple wavelengths given by:

$$R = \frac{(\varepsilon^{1/2} - 1)^2}{(\varepsilon^{1/2} + 1)^2}$$

where $\varepsilon$ is a dielectric constant of a material.

38. The LIDAR-based system of claim 30, wherein the computing system is configured to determine velocimetry of the object using two-pulse excitation, the two-pulse excitation comprising:

transmitting two laser pulses, by the at least one laser, that are separated from one another by a fixed optical delay;

collecting signal returns from the transmitted two laser pulses, by the at least one detector;

measuring arrival times of each signal return, by the computing system; and calculating a range and object motion velocity based on this measurement, by the computing system.

39. The LIDAR-based system of claim 30, wherein a Mie scattering model is used to derive the size of debris.

40. A light detection and ranging (LIDAR)-based system, comprising:

a plurality of LIDAR vehicles; and at least one framework vehicle connecting the plurality of LIDAR vehicles, wherein each of the plurality of LIDAR vehicles comprises:

a laser configured to transmit a beam comprising light pulses at a predetermined wavelength and pulse repetition rate, a light-sensitive receiver configured to:
receive light from the beam of light pulses after being reflected off of an object, reemitted after absorption by the object, or both, and
generate a voltage or a current from the received light, and a computing system configured to receive the generated voltage or current from the light-sensitive receivers of the plurality of LIDAR vehicles and determine object location, distance, velocity, change in velocity, size, rotation, material properties, or any combination thereof, from the voltage or current received from the light-sensitive receivers, wherein the pulse repetition rate is set such that the object will be contacted by pulses at least twice when traveling through the volumetric distribution of laser energy at a maximum relative orbital velocity, the beam optimized for surface area.

41. The LIDAR-based system of claim 40, wherein the laser of each LIDAR vehicle emits a beam at a unique laser wavelength and the light-sensitive receiver of each LIDAR vehicle is sensitive to the unique wavelength of the laser of that LIDAR vehicle, constituting a unique channel for the respective LIDAR vehicle.

42. The LIDAR-based system of claim 40, wherein each LIDAR vehicle transmits a rotating beam of pulsed laser light within a plane that is different than those defined by rotating beams of other LIDAR vehicles in the system.

43. The LIDAR-based system of claim 42, wherein
the transmitted rotating beams from the LIDAR vehicles provide a return signal after reflecting off of the object and/or being reemitted by the object, and
the computing system is configured to plot the return signal for each channel as a function of time to calculate the location more precisely.

* * * * *